US010091451B2

(12) United States Patent
Lee et al.

(10) Patent No.: US 10,091,451 B2
(45) Date of Patent: Oct. 2, 2018

(54) REMOTE CONTROLLER AND METHOD FOR CONTROLLING SCREEN THEREOF

(71) Applicant: SAMSUNG ELECTRONICS CO., LTD., Suwon-si (KR)

(72) Inventors: Seok-jae Lee, Seoul (KR); Ji-won Choo, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/513,912

(22) Filed: Oct. 14, 2014

(65) Prior Publication Data

US 2015/0237290 A1 Aug. 20, 2015

(30) Foreign Application Priority Data

Feb. 19, 2014 (KR) .................. 10-2014-0019284

(51) Int. Cl.
*H04N 5/44* (2011.01)
*H04N 5/445* (2011.01)
(Continued)

(52) U.S. Cl.
CPC ......... *H04N 5/44591* (2013.01); *G08C 17/02* (2013.01); *G08C 23/04* (2013.01);
(Continued)

(58) Field of Classification Search
CPC ...... H04N 5/445; H04N 5/44; H04N 5/44591; H04N 5/4403; H04N 9/74; H04N 5/45; H04N 5/66
(Continued)

(56) References Cited

U.S. PATENT DOCUMENTS 5,537,152 A * 7/1996 Ishikawa .............. H04N 5/4403
348/569
5,867,227 A * 2/1999 Yamaguchi .............. H04N 5/45
348/565
(Continued)

FOREIGN PATENT DOCUMENTS

CN 1750619 A 3/2006
CN 101662607 A 3/2010
(Continued)

OTHER PUBLICATIONS

Communication dated Jun. 25, 2015, issued by the European Patent Office in counterpart European Patent Application No. 15154283.4.
(Continued)

*Primary Examiner* — Trang U Tran
(74) *Attorney, Agent, or Firm* — Sughrue Mion, PLLC

(57) ABSTRACT

A remote controller and a method for controlling a screen using the remote controller are provided. The remote controller includes a first screen key; an output interface configured to output a control signal; and a controller configured to control the first screen key and the output interface. The controller outputs first control information corresponding to a press of the first screen key to a display by using the output interface. The first control information is information for scaling a content screen displayed on the display and for displaying the scaled content screen on a first screen area of split screen areas of the display.

12 Claims, 22 Drawing Sheets

(51) Int. Cl.
*H04N 5/45* (2011.01)
*H04N 21/431* (2011.01)
*H04N 21/422* (2011.01)
*H04N 21/4223* (2011.01)
*G08C 17/02* (2006.01)
*G08C 23/04* (2006.01)

(52) U.S. Cl.
CPC ............. *H04N 5/4403* (2013.01); *H04N 5/45* (2013.01); *H04N 21/4223* (2013.01); *H04N 21/42204* (2013.01); *H04N 21/42224* (2013.01); *H04N 21/4312* (2013.01); *H04N 21/4316* (2013.01); *G08C 2201/30* (2013.01)

(58) Field of Classification Search
USPC ................. 348/563–565, 569, 734, 553–555
See application file for complete search history.

(56) References Cited

U.S. PATENT DOCUMENTS

| | | | |
|---|---|---|---|
| 6,147,715 A | 11/2000 | Yuen et al. | |
| 6,441,862 B1 | 8/2002 | Yuen et al. | |
| 7,154,558 B2* | 12/2006 | Yui | H04N 5/45 348/564 |
| 7,574,656 B2* | 8/2009 | Billmaier | G06F 3/0482 715/719 |
| 7,663,700 B2 | 2/2010 | Yuen et al. | |
| 7,814,421 B2* | 10/2010 | Reynolds | H04N 5/44543 348/563 |
| 8,134,645 B2 | 3/2012 | Yuen et al. | |
| 8,947,601 B2* | 2/2015 | Lee | G06F 17/3025 348/563 |
| 9,055,341 B2 | 6/2015 | Yuen et al. | |
| 9,237,296 B2* | 1/2016 | Jung | H04N 1/00448 |
| 2002/0144267 A1 | 10/2002 | Gutta et al. | |
| 2002/0181936 A1 | 12/2002 | Yuen et al. | |
| 2004/0261108 A1 | 12/2004 | Yuen et al. | |
| 2006/0236360 A1 | 10/2006 | Yuen et al. | |
| 2008/0184293 A1 | 7/2008 | Yuen et al. | |
| 2010/0053436 A1* | 3/2010 | Arisaka | H04N 5/45 348/564 |
| 2011/0041152 A1 | 2/2011 | Reynolds et al. | |
| 2011/0113447 A1 | 5/2011 | Jung | |
| 2012/0137326 A1 | 5/2012 | Yuen et al. | |
| 2013/0014165 A1 | 1/2013 | Yuen et al. | |
| 2013/0057765 A1* | 3/2013 | Zeleznikar | H04N 21/42207 348/570 |
| 2013/0097639 A1 | 4/2013 | Yuen et al. | |

FOREIGN PATENT DOCUMENTS

| | | |
|---|---|---|
| KR | 10-2005-0059353 A | 6/2005 |
| KR | 10-2011-0051896 A | 5/2011 |
| WO | 9734414 A1 | 9/1997 |

OTHER PUBLICATIONS

Communication dated Jun. 13, 2017 by the State Intellectual Property Office of P.R. China in counterpart Chinese Patent Application No. 201510079633.0.

Communication issued by the Korean Intellectual Patent Office dated Feb. 19, 2018 in counterpart Korean Patent Application No. 10-2014-0019284.

* cited by examiner

FIG. 7B
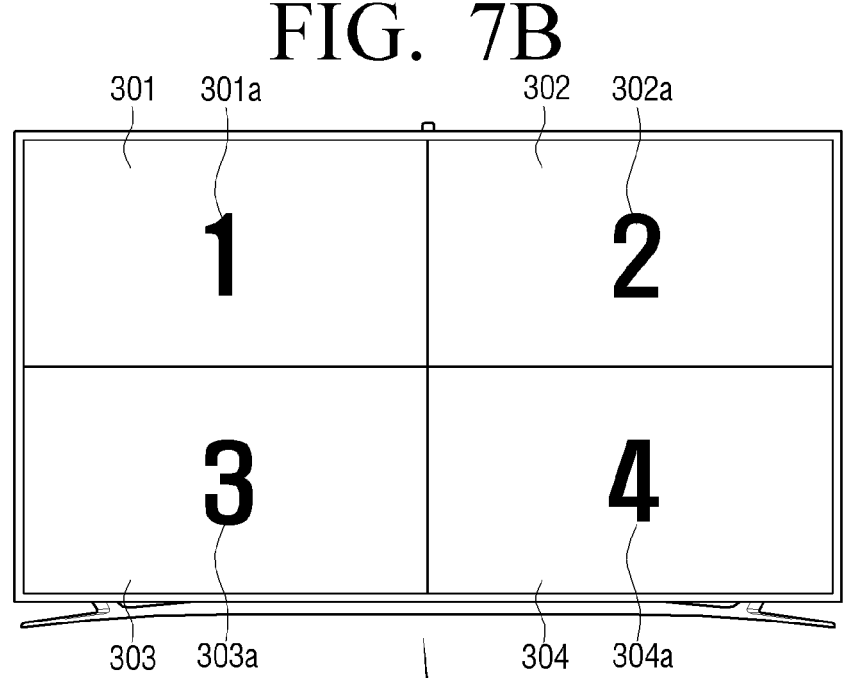
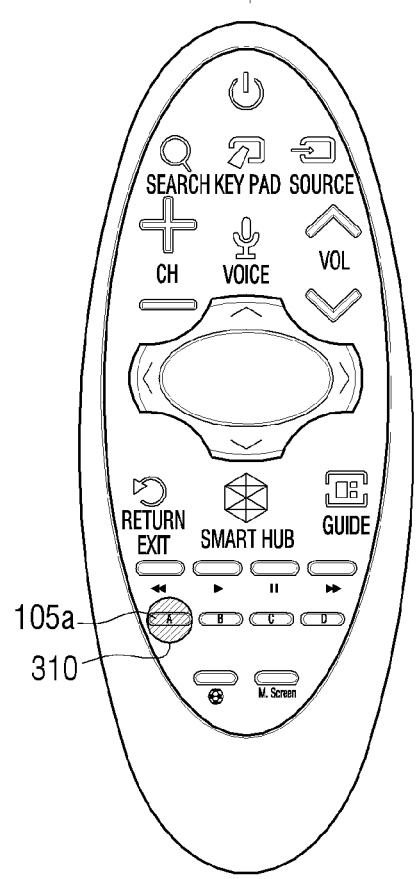

FIG. 7C
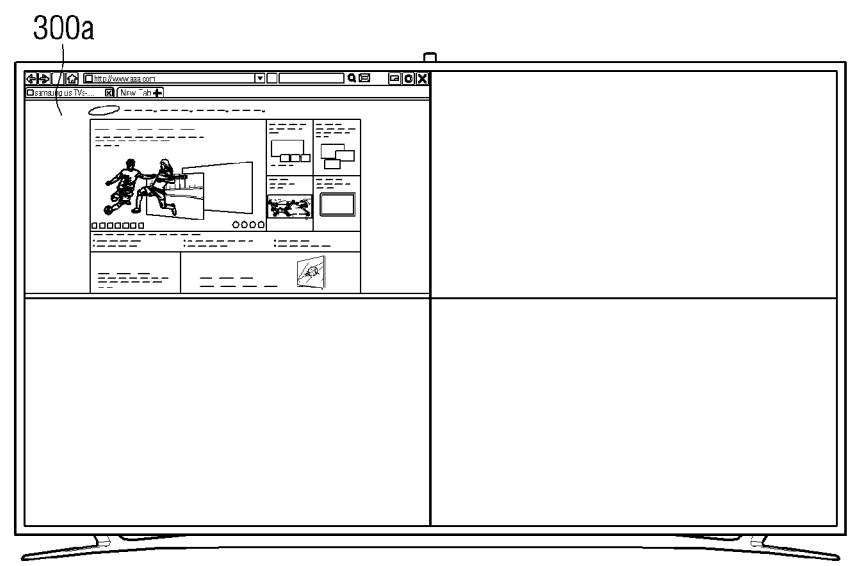
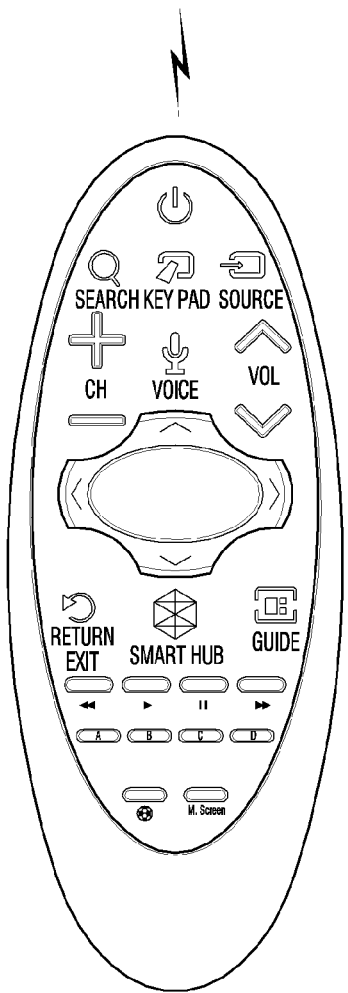

FIG. 8A
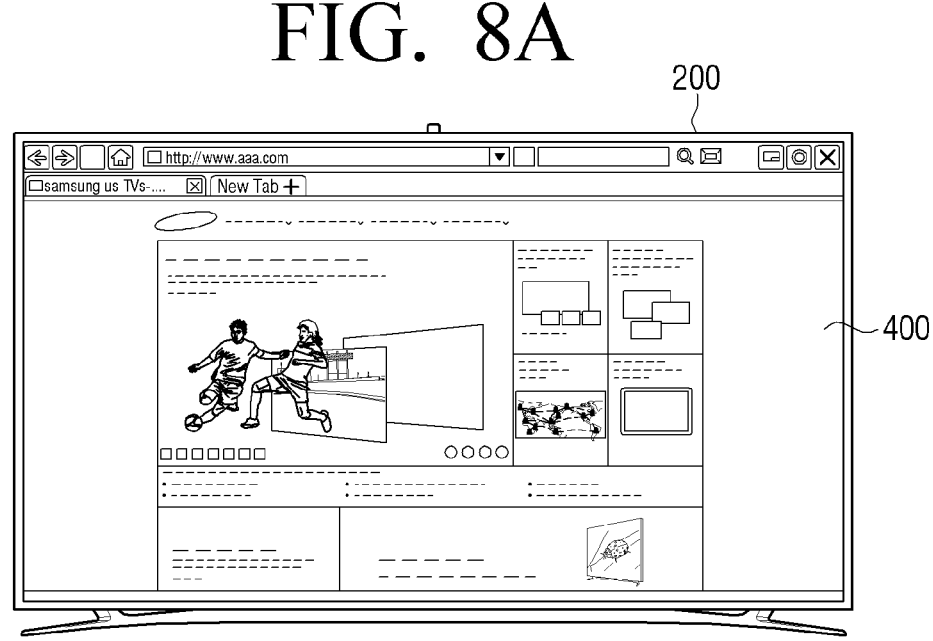
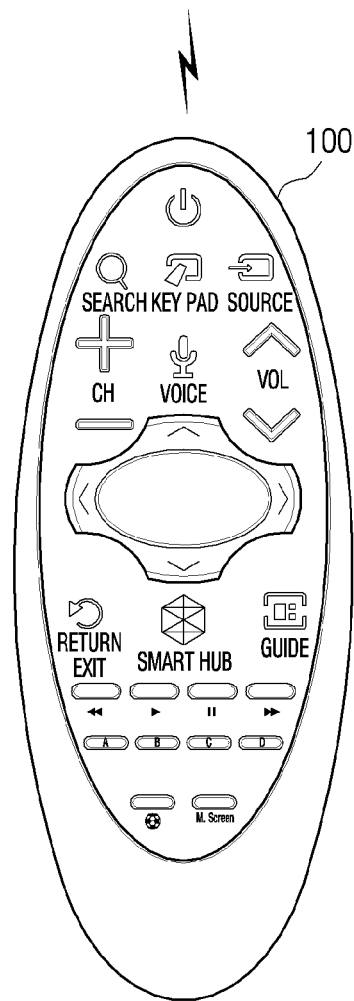

FIG. 8B
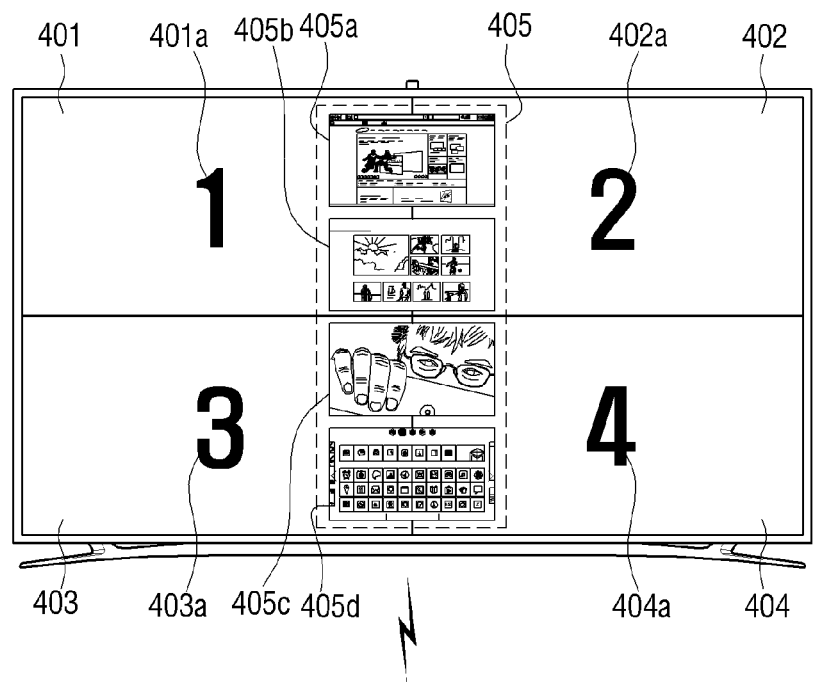
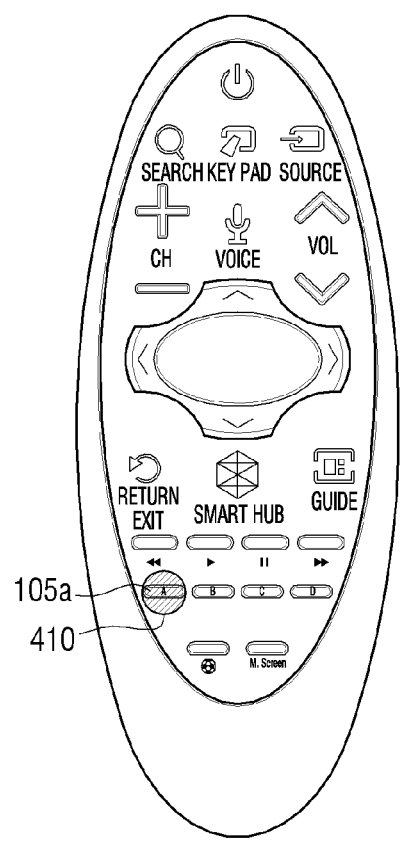

FIG. 9B
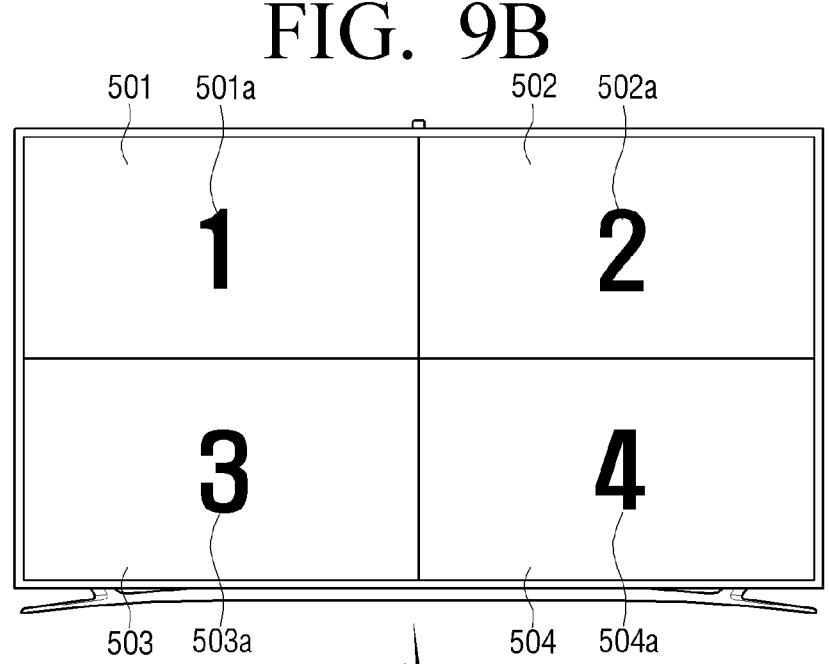
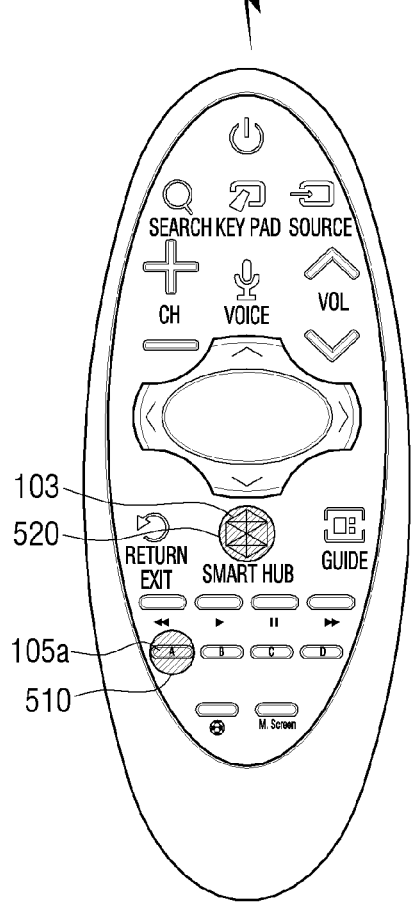

FIG. 9C
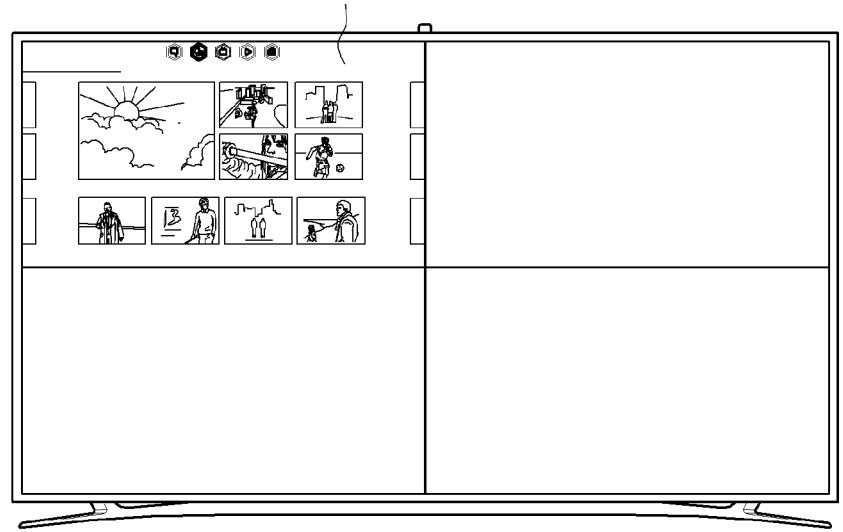
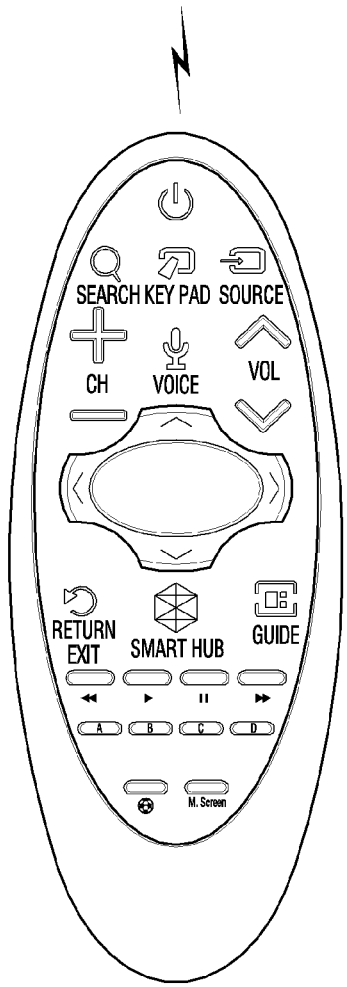

FIG. 10D
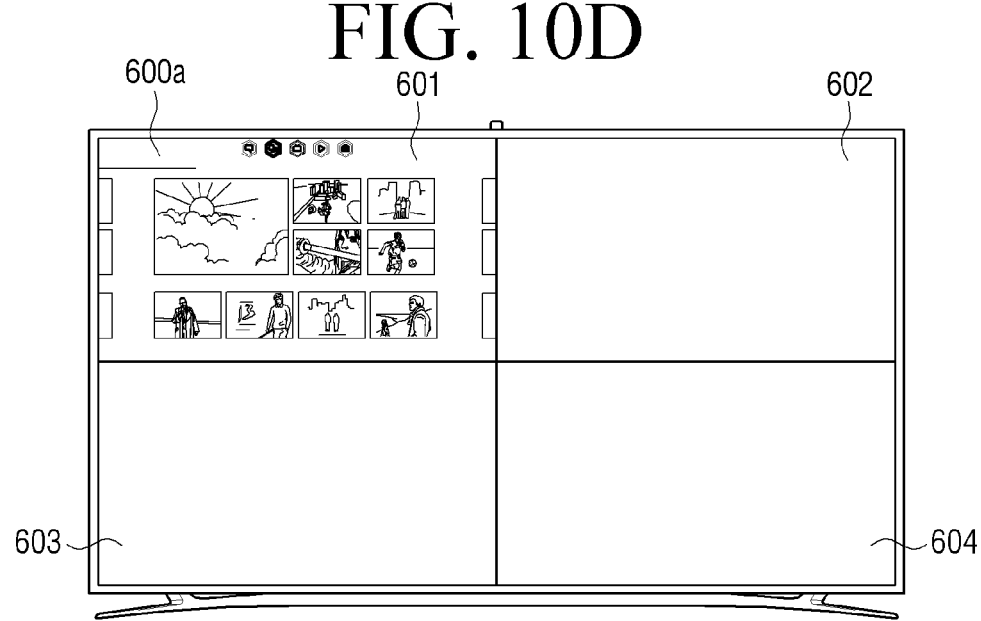
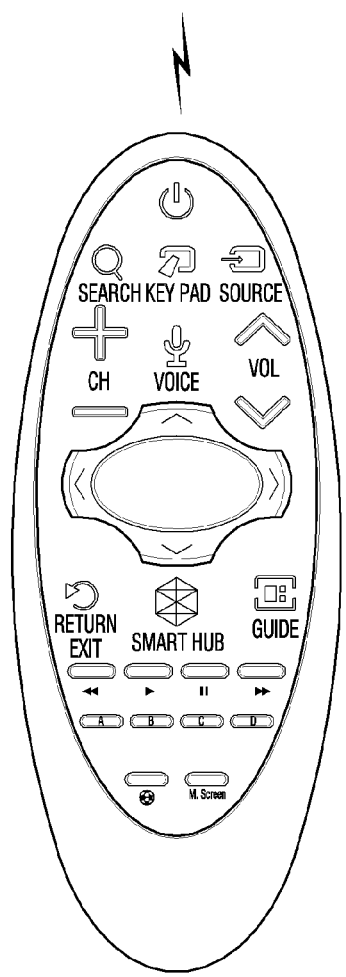

REMOTE CONTROLLER AND METHOD FOR CONTROLLING SCREEN THEREOF

CROSS-REFERENCE TO RELATED APPLICATION(S)

This application claims priority from Korean patent application filed on Feb. 19, 2014 in the Korean Intellectual Property Office and assigned Serial No. 10-2014-0019284, the entire disclosure of which is hereby incorporated by reference.

TECHNICAL FIELD

Apparatuses and methods consistent with exemplary embodiments relate to a remote controller and a method for controlling a screen thereof, and more particularly, to a remote controller which controls split screens of a display apparatus by using a key, and a method for controlling a screen thereof.

BACKGROUND

As a method for interfacing between a display apparatus and a user, a panel key of the display apparatus or a remote controller is increasingly used. With the development of technology, as the functions of the display apparatus have become complicated and have diversified, the display apparatus is able to execute contents such as a downloaded moving image and perform Internet browsing.

However, due to a limited size of the remote controller and a limited number of keys, it is difficult for users to remotely control such complicated and diversified functions of the display apparatus.

In addition, when a screen of the display apparatus is split to display a TV broadcast and an Internet screen separately, the user should perform a complicated procedure to select the TV broadcast and the Internet screen to be displayed on the split screens by using the remote controller with fewer keys and a small size, and thus the remote controller is not easy to use.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

It is an aspect to provide a remote controller which controls split screens of a display apparatus by using a key, and a method for controlling a screen thereof.

According to an aspect of an exemplary embodiment, there is provided a remote controller including a first screen key; an output interface configured to output a control signal; and a controller configured to control the first screen key and the output interface, wherein the controller outputs first control information corresponding to a press of the first screen key to a display apparatus by using the output interface, and wherein the first control information is information for scaling a content screen displayed on the display apparatus and for displaying the scaled content screen on a first split screen area of a plurality of split screen areas of the display apparatus.

The remote controller may further comprise a communicator connected with the display apparatus, wherein the controller transmits the first control information to the display apparatus by using the communicator.

The first screen key may be a multi function key corresponding to an additional function which is set differently according to a plurality of executing functions of the display apparatus.

The remote controller may comprise a plurality of selectable screen keys including the first screen key, wherein a number of the selectable screen keys is changed according to a number of split screens of the display apparatus.

The remote controller may further comprise a touch pad configured to receive a touch of the user, wherein the controller selects a reduced content screen to be displayed on the first split screen area from among the plurality of split screen areas of the display apparatus in response to a touch of the user input through the touch pad.

According to another aspect of an exemplary embodiment, there is provided a display apparatus comprising a receiver configured to receive a control signal including control information corresponding to a first screen key from a remote controller; and a controller configured to control the receiver, wherein the controller splits a screen of the display apparatus according to the received control information and scales a content screen to be displayed on a first split screen area from among a plurality of split screen areas and displays the scaled content screen.

The display apparatus may further comprise a communicator connected with the remote controller, wherein the controller receives the control signal corresponding to the first screen key from the remote controller through the communicator.

According to yet another aspect of an exemplary embodiment, there is provided a method for controlling a screen of a remote controller, the method comprising receiving a first user input corresponding to a selection of a first screen key in the remote controller for controlling a display apparatus on which a content screen is displayed; and outputting a first control signal corresponding to the selection of the first screen key to the display apparatus, wherein the first control signal comprises information for displaying the content screen on a first split screen area from among a plurality of split screen areas of the display apparatus.

The content screen may comprise a content screen which is being displayed on the display apparatus, and a content screen which is displayed on the display apparatus by a key selected on the remote controller.

The content screen may comprise an application screen on which an application is executed and displayed, a TV broadcast screen, a web page, or a smart hub screen.

The remote controller may comprise a plurality of selectable screen keys comprising the first screen key, wherein a number of the selectable screen keys is determined by device information of the display apparatus.

The receiving the first user input may comprise, in response to the selection of the first screen key being maintained for a threshold time, outputting a second control signal to display a plurality of thumbnail content screens displayable on the first screen area on the display apparatus.

The method may further comprise receiving a second user input corresponding to a selection of a direction key provided on the remote controller; and outputting a third control signal corresponding to the selection of the direction key to the display apparatus, wherein the third control signal comprises information for displaying a content screen selected from among the plurality of thumbnail content screens, on the first screen area.

A size of the thumbnail content screen may be smaller than a size of the first split screen area.

The method may further comprise maintaining the selection of the first screen key and continuously receiving a third user input corresponding to a selection of a smart hub key provided on the remote controller; and outputting a fourth control signal corresponding to the selection of the smart hub key to the display apparatus, wherein the fourth control signal comprises information for displaying a smart hub screen corresponding to the smart hub key on the first split screen area from among the plurality of split screen areas.

According to yet another aspect of an exemplary embodiment, there is provided a method for controlling a screen of a remote controller, the method comprising receiving a first user input corresponding to a selection of a multi screen key in the remote controller for controlling a display apparatus on which a content screen is displayed; and outputting a first control signal corresponding to the selection of the multi screen key to the display apparatus, wherein the first control signal comprises information for displaying a plurality of thumbnail screen areas to be superimposed on the content screen.

The method may further comprise receiving a second user input corresponding to a selection of a first screen key; and outputting a second control signal corresponding to the selection of the first screen key to the display apparatus, wherein the second control signal comprises information for displaying the content screen on a first thumbnail screen area from among the plurality of thumbnail screen areas.

According to yet another aspect of an exemplary embodiment, there is provided a system comprising a display apparatus having a screen that is configurable into a plurality of split screen areas, the display apparatus comprising a receiver configured to receive a control signal, and a controller configured to control the receiver and the screen of the display apparatus; and a remote controller comprising a plurality of screen keys, each assigned to a different split screen area among the plurality of split screen areas of the display apparatus, an output interface configured to output a control signal, and a controller configured to control the output interface and the plurality of screen keys, wherein in response to an actuation of one of the plurality of screen keys, the controller of the remote controller outputs, using the output interface, a control signal including information for scaling a content screen previously displayed on the display apparatus and for displaying the scaled content screen on a split screen corresponding to the actuated screen key, and the controller of the display apparatus receives, using the receiver, the control signal and controls the display apparatus to scale the content screen and display the scaled content screen on the split screen corresponding to the actuated screen key.

The content screen may comprise an application screen on which an application is executed and displayed, a TV broadcast screen, a web page, a smart hub screen, or a thumbnail screen.

BRIEF DESCRIPTION OF THE DRAWINGS

The above and/or other aspects will be more apparent by describing in detail exemplary embodiments, with reference to the accompanying drawings, in which:

FIGS. 7A to 7C are views illustrating an example of the method of FIG. 3;

FIGS. 8A to 8D are views illustrating an example of the method of FIG. 4;

FIGS. 9A to 9C are views illustrating an example of the method of FIG. 5;

FIGS. 10A to 10D are views illustrating an example of the method of FIG. 6; and

DETAILED DESCRIPTION

Figure 1A:
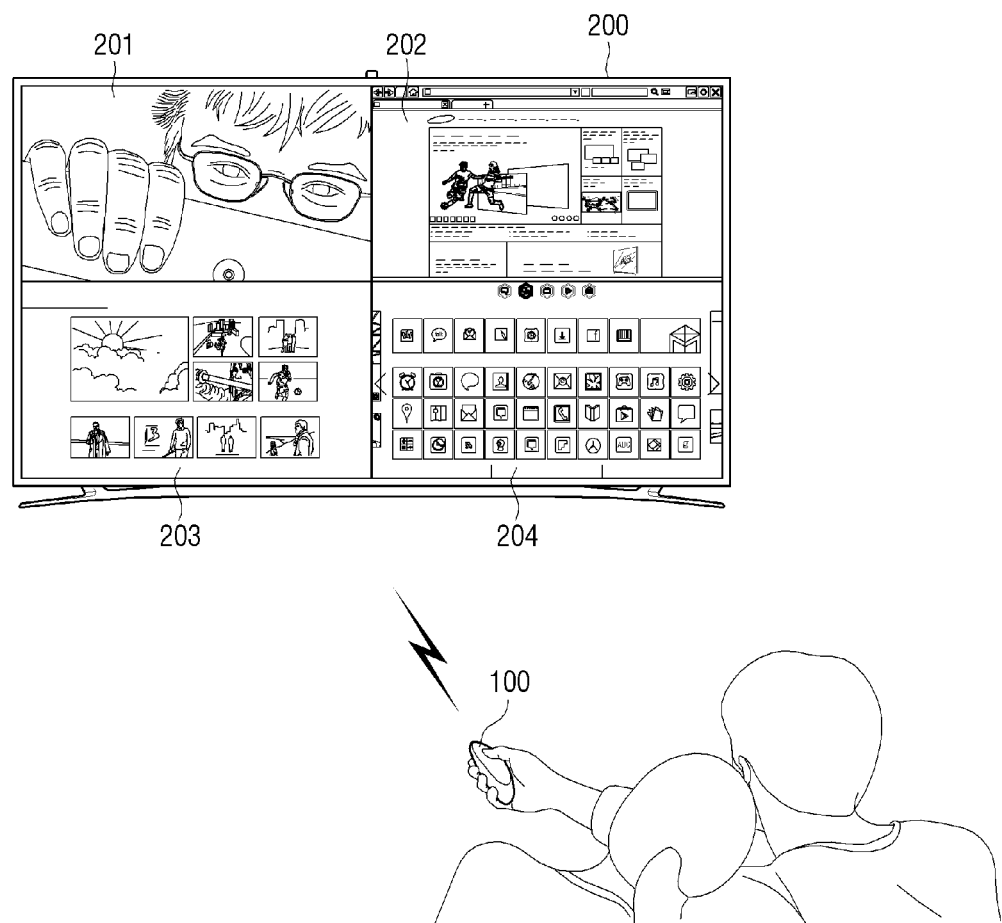
FIG. 1A is a view schematically illustrating an operation between a remote controller and a display apparatus according to an exemplary embodiment.

Hereinafter, exemplary embodiments will be described in greater detail with reference to the accompanying drawings. In addition, a method for manufacturing and using an electronic device according to exemplary embodiments will be explained in detail with reference to the accompanying drawings.

In the drawings, same reference numerals or signs are used to indicate the same components or elements.

Although the terms such as 'first' and 'second' are used to describe elements, these element should not be limited by such terms. These terms are used for the purpose of distinguishing one element from another element only. For example, a 'first' element may be termed as a 'second' element and similarly a 'second' element may be termed as a 'first' element without departing from the scope of the present disclosure. As used herein, the term "and/or" includes any and all combinations of one or more of the associated listed items.

The terms used herein are for the purpose of describing particular exemplary embodiments only and are not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components, or groups thereof, but do not preclude the presence or addition of one or more other features, integers, steps, operations, elements, components, or groups thereof.

In this specification, "selecting a key" provided on a remote controller 100 refers to pressing or touching a key.

FIG. 1A is a view schematically illustrating an operation between a remote controller and a display apparatus according to an exemplary embodiment.

Referring to FIG. 1A, a remote controller 100 and a display apparatus 200 are illustrated. The remote controller 100 may control the display apparatus 200 by using short-range communication including Infrared Data Association (IrDA) or Bluetooth. A user may control the functions of the display apparatus 200 by using a key (including a button), a touch pad, voice recognition, or motion recognition of the remote controller 100. For example, the user may control power on/off, channel change, volume control, and video reproduction of the display apparatus 200.

The user may split a screen of the display apparatus 200 by using the remote controller 100 to display a variety of content screens (for example, a screen of an application shortcut icon corresponding to an executable application, a TV broadcast, a smart hub screen, and/or a webpage. For example, the screen of the display apparatus 200 may be split into 2 screens, 3 screens, or 4 screens. However, the number of screens is not particularly limited.

The number of split screens of the display apparatus 200 may be known by using items of device information of the display apparatus 200. For example, the items of the device information may include an output resolution of the display apparatus 200, a diagonal length of the screen, width/height lengths of the screen (or the display apparatus 200), and/or an aspect ratio of the screen. The device information may refer to information corresponding specifications disclosed in the manual or webpage of the display apparatus 200. The device information may include an item corresponding to the number of split screens of the display apparatus (for example, 2, 3, 4, 6, 9, variable, etc.).

The device information is stored in a storage 280 (see FIG. 2 and description below). The device information may be downloaded from an external source of the display apparatus 200 via a communicator 230 under the control of a controller of the display apparatus 200.

The output resolution may include a High Definition (HD), a full HD, and an ultra HD. The diagonal length of the screen may include 66 cm, 80 cm, 101 cm, 152 cm, 189 cm, 200 cm, or more. The width/height lengths of the screen (or the display apparatus 200) may include 643.4 mm×396.5 mm, 934.0 mm×548.6 mm, 1,670.2 mm×962.7 mm, 2,004.3 mm×1,635.9 mm, etc. The aspect ratio of the screen may include 4:3, 16:9, 16:10, 21:9, or 21:10.

It will be easily understood by an ordinary skilled person in the related art that the items included in the device information may be changed according to the performance or configuration of the display apparatus 200.

Figure 1B:
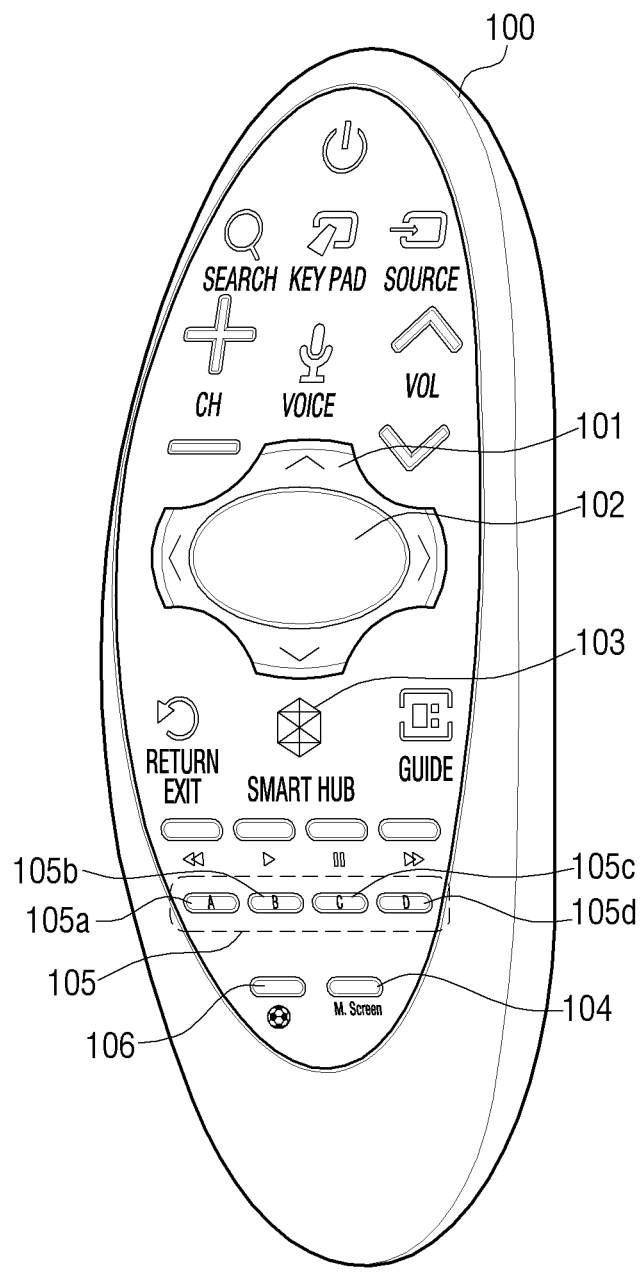
FIG. 1B is a perspective view schematically illustrating a remote controller according to an exemplary embodiment.

FIG. 1B is a perspective view schematically illustrating a remote controller according to an exemplary embodiment.

Referring to FIG. 1B, the remote controller 100 includes a touch pad 102 and/or a variety of keys (buttons) corresponding to the functions of the display apparatus 200. The remote controller 100 may include one or more single function keys and/or one or more multi-function keys corresponding to the various functions performed in the display apparatus 200.

The single function key (for example, a smart hub key 103, a multi-screen key 104) of the remote controller 100 may indicate a key corresponding to control of a single function from among the various functions performed in the display apparatus 200. In some exemplary embodiments, most of the keys provided on the remote controller 100 may be the single function key.

The multi-function key (for example, a color key 105) of the remote controller 100 may indicate a key corresponding to control of an additional function which is provided (or set) differently according to a function performed in the display apparatus 200. In some exemplary embodiments, the color key 105 may include a red key 105a, a green key 105b, a yellow key 105c, and a blue key 105d. An arrangement order of the color key 105 may be changed and the number of color keys 105 may be changed by adding or deleting a key.

According to an exemplary embodiment, the color key 105 may be used to display a content displayed on the display apparatus 200 on one screen area (for example, a first screen area) from among a plurality of split screens (see, e.g., screens 201, 202, 203, 204 in FIG. 1). For example, the red key 105a of the color key 105 may be used to display a content screen on the first screen area 201 (see FIG. 1A), and may be termed a "first screen key". The green key 105b may be used to display a content screen on a second screen area 202 (see FIG. 1A) and may be termed a "second screen key". The yellow key 105c may be used to display a content screen on a third screen area 203 (see FIG. 1A), and may be termed a "third screen key". The blue key 105d may be used to display a content screen on a fourth screen area 204 (see FIG. 1A) and may be termed a "fourth screen key".

The number of color keys 105 of the remote controller 100 may be changed according to the number of split screens of the display apparatus 200. For example, in response to the screen of the display apparatus 200 being split into two screens, the number of allocated color keys 105 of the remote controller 100 is 2 and, for example, the red key 105a and the green key 105b may be allocated. In such a configuration, the yellow key 105c and the blue key 105d are not used to control the split screens. However, it will be noted that the yellow key 105c and the blue key 105d may be assigned a different function. Thus, in response to the yellow key 105c and the blue key 105d being selected by the user, the display apparatus 200 the screen of which is split into the two screens may not be controlled by respective control signals of the yellow key 105c and the blue key 105d.

In response to the screen of the display apparatus 200 being split into three screens, the number of allocated color keys 105 of the remote controller 100 is 3 and, for example, the red key 105a, the green key 105b, and the yellow key 105c may be allocated. In response to the blue key 105d being selected by the user, the display apparatus 200 the screen of which is split into the three screens may not be controlled by a control signal corresponding to the blue key 105d.

In response to the screen of the display apparatus 200 being split into four screens, the number of allocated color keys 105 of the remote controller 100 is 4 and, for example, the red key 105a, the green key 105b, the yellow key 105c, and the blue key 105d may be allocated.

Figure 2:
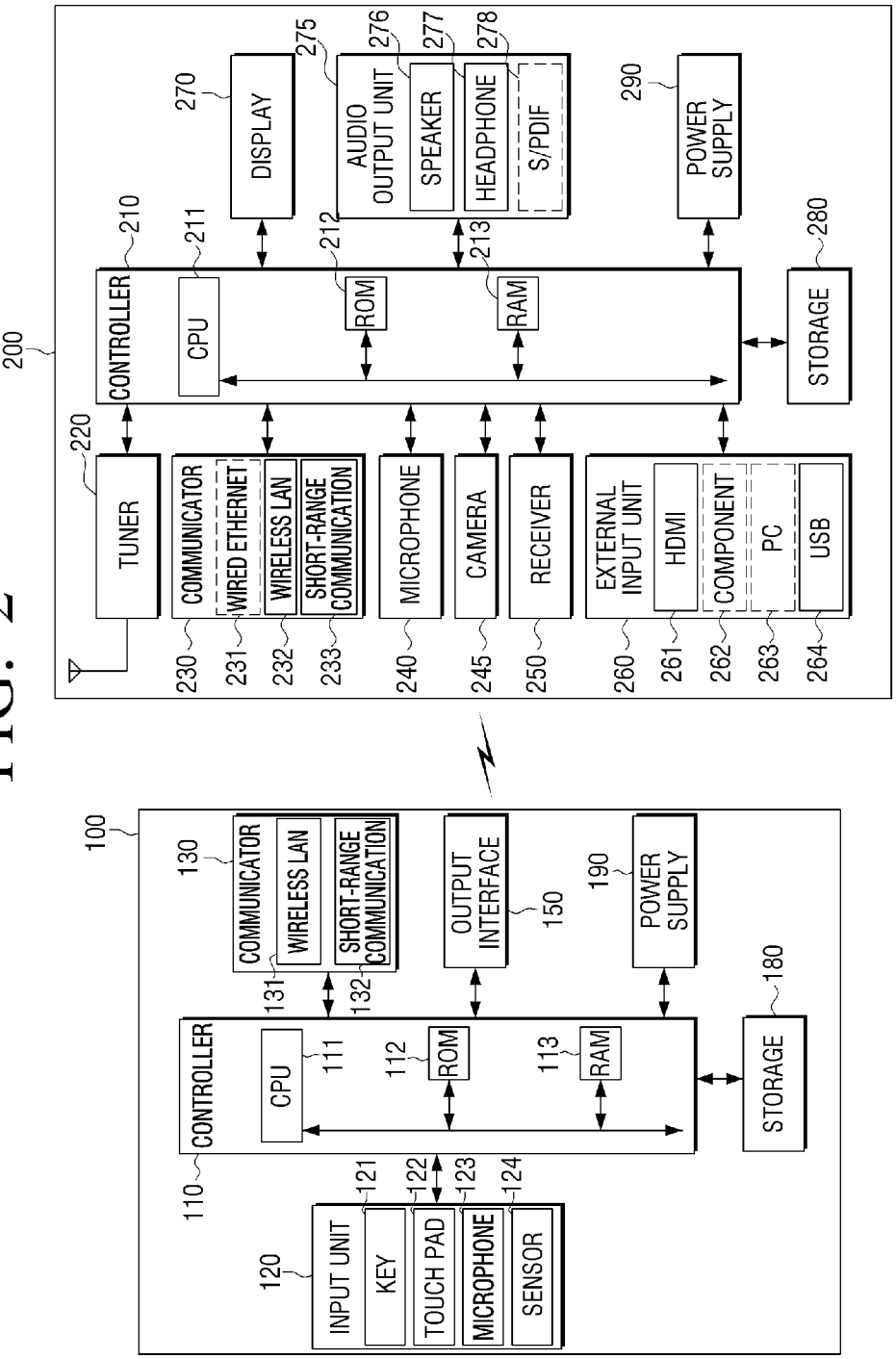
FIG. 2 is a block diagram illustrating a remote controller and a display apparatus according to an exemplary embodiment.

FIG. 2 is a block diagram illustrating a remote controller and a display apparatus according to an exemplary embodiment.

Referring to FIG. 2, the remote controller 100 for controlling the display apparatus 200 includes a controller 110, an input unit 120, a communicator 130, an output interface 150, a storage 180, and a power supply 190. The remote controller 100 may include the controller 110, the input unit 120, the light output unit 150, the storage 180, and the power supply 190 without the communicator 130. In some exemplary embodiments, the output interface 150 may be a light output interface.

The remote controller 100 may be termed an electronic device which can control the display apparatus 200. The remote controller 100 may include an electronic device which can install an application (not shown) for controlling the display apparatus 200. The electronic device with a display (for example, a touch panel or a display panel) which can install the application (not shown) for controlling the display apparatus 200 may include a mobile phone (not shown), a smartphone (not shown), a tablet PC (not shown), or a notebook PC (not shown).

The user may control the display apparatus 200 by using a function key (for example, a volume key, not shown) of a Graphic User Interface (GUI) (not shown) provided by the installed application. The remote controller 100 may include another display apparatus which can install an application (not shown) for controlling the display apparatus 200.

The controller 110 may include a central processing unit (CPU) 111, a Read Only Memory (ROM) 112 in which a control program for controlling the remote controller 100 is stored, and a Random Access Memory (RAM) 113 which stores signals or data input from an external source of the remote controller 100 or which is used as a storage area for various jobs performed in the remote controller 100.

The controller 110 controls an overall operation of the remote controller 100 and a signal flow among the internal elements 120 to 190, and performs a data processing function. The controller 110 controls the power supply to supply power to the internal elements 120 to 180. The CPU 111, the ROM 112, and the RAM 113 are connected to one another via an internal bus.

The term "controller" used herein includes the CPU 111, the ROM 112, and the RAM 113.

The input unit 120 may include a key 121 or a touch pad 122 to receive an input of the user for controlling the display apparatus 200. The input unit 120 may include a microphone 123 to receive a user's uttered voice, or a sensor 124 (for example, a motion sensor, a gyro sensor, an acceleration sensor, a gravity sensor, etc.) to detect a motion of the remote controller 100. The key 121 may include the keys 103, 104, and 105 of FIG. 1B. The touch pad may include the touch pad 102 of FIG. 1B.

The input unit 120 may output a signal (for example, an analogue signal or a digital signal) corresponding to the received user input (for example, a touch, a press, a touch gesture, or a motion) to the controller.

The communicator 130 may transmit a control signal corresponding to a user input to the display apparatus 200 connected with the remote controller 100 under the control of the controller. The communicator 130 may include at least one of a wireless Local Area Network (LAN) unit 131 and a short-range communication unit 132. For example, the communicator 130 may include one of the wireless LAN interface 131 and the short-range communication interface 132 or both of the wireless LAN interface 131 and the short-range communication interface 132.

The wireless LAN interface 131 may be wirelessly connected with an Access Point (AP) under the control of the controller 110 in a place where the AP is installed. The wireless LAN interface 131 supports the wireless LAN standard IEEE802.11x of IEEE. The short-range communication interface 132 may perform short-range communication between the remote controller 100 and an external device wirelessly without the AP under the control of the controller. The short-range communication may include Bluetooth, Bluetooth low energy, Infrared Data Association (IrDA), Wi-Fi, Ultra Wideband (UWB), and Near Field Communication (NFC).

The output interface 150 outputs a signal (for example, including a control signal) corresponding to the received user input (for example, a touch, a press, a touch gesture, a voice, or a motion) to a receiver 250 of the display apparatus 200 under the control of the controller. In some exemplary embodiments, the output interface 150 may output an optical signal. A remote control code format used in the remote controller 100 may be one of a manufacturer-dedicated remote control code format and a common remote control code format. The remote control code format may include a leader code and a data word. In the case of an optical signal, the output optical signal may be modulated by a carrier wave and output. The control signal may be stored in the storage 180 or may be generated by the controller. The remote controller 100 may include an infrared-laser emitting diode (IR-LED).

The remote controller 100 may include at least one of the communicator 130 and the output interface 150. For example, the remote controller 100 may include one of the communicator 130 and the output interface 150, or may include both of the communicator 130 and the output interface 150. The controller may output the control signal corresponding to the user input to the display apparatus 200 by selectively using one of the communicator 130 and the output interface 150.

The storage 180 may store various data, programs, or applications for driving and controlling the remote controller 100 under the control of the controller. The storage 180 may store signals or data which are input or output according to driving of the communicator 130, the output interface 150, and the power supply 190. The storage 180 may store the control signal corresponding to the received user input (for example, a touch, a press, a touch gesture, a voice or a motion) under the control of the controller.

The power supply 190 supplies power to the internal elements 120 to 180 of the remote controller 100 under the control of the controller. The power supply 190 may supply power to the internal elements 120 to 180 from one or two or more batteries (not shown) installed in the remote controller 100. The battery or batteries may be located between the key 121 and the touch pad 122 provided on a surface of the remote controller 100, and a rear cover (not shown).

At least one element may be added to or deleted from the elements of the remote controller 100 shown in FIGS. 1B and 2 according to the performance of the remote controller 100. It will be easily understood by an ordinary skilled person in the related art that locations of the elements may be changed according to the performance or configuration of the remote controller 100.

Referring to FIG. 2, the display apparatus 200 which receives a control signal from the remote controller 100 may be connected with an external device (not shown) in a wired or wireless manner by using a communicator 230 or an external input unit 260. The external device may include a mobile phone (not shown), a smartphone (not shown), a tablet PC (not shown), and a server (not shown).

The display apparatus 200 may include one of a tuner 220, the communicator 230, and the external input unit 260 in addition to a display 270.

The display apparatus 200 may include a combination of the tuner 220, the communicator 230, and the external input unit 260 in addition to the display 270. The display apparatus 200 including the display 270 may be electrically connected with an external device (not shown) including a tuner. For example, the display apparatus 200 may be implemented by using an analogue TV, a digital TV, a 3D TV, a smart TV, a Light Emitting Diode (LED) TV, an Organic LED (OLED) TV, a plasma TV, or a monitor. However, it will be easily understood that these devices are only examples and should not be considered as limiting.

The display apparatus 200 includes the tuner 220, the communicator 230, a microphone 240, a camera 245, the receiver 250, the external input unit 260, the display 270, the audio output unit 275, a storage 280, a controller 210, and a power supply 290. The display apparatus 200 may further include a sensor (for example, an illuminance sensor, a temperature sensor, etc., not shown) to detect an inside or outside state of the display apparatus 200.

The controller 210 may include a central processing unit (CPU) 211, a ROM 212 in which a control program for controlling the display apparatus 200 is stored, and a RAM 213 which stores signals or data input from an external source of the display apparatus 200 or which is used as a storage area corresponding various jobs performed in the display apparatus 200.

The controller 211 controls an overall operation of the display apparatus 200 and controls a signal flow among the internal elements 220 to 290 of the display apparatus 200, and performs a data processing function. The controller 211 controls power supplied to the internal elements 220 to 280 from the power supply 290. In response to a user input or a predetermined and stored condition being satisfied, the controller may execute an operation system (OS) and various applications stored in the storage.

The CPU 211 may include a Graphic Processing Unit (GPU) for processing graphics corresponding to an image or a video. The CPU 211 may have a core (not shown) and the GPU (not shown) implemented as a System On Chip (SoC). The CPU 211 may include a single core, a dual core, a triple core, a quad core, and a core of a multiple thereof.

The CPU 211 may include a plurality of processors, for example, a main processor (not shown) and a sub processor (not shown) which is operated in a sleep mode. The CPU 211, the ROM 212, and the RAM 213 may be connected with one another via an internal bus.

The term "controller of the display apparatus" in the exemplary embodiments includes the CPU 211, the ROM 212, and the RAM 213.

It will be easily understood by an ordinary skilled person in the related art that the configuration and operation of the controller may be implemented variously according to an exemplary embodiment.

The tuner 220 may tune and select only a frequency of a channel that the display apparatus 200 intends to receive from among many radio wave components by performing amplification, mixing, resonance, etc., with respect to a broadcast signal received in a wired or wireless manner. The broadcast signal includes a video, an audio, and data (for example, an Electronic Program Guide (EPG)).

The tuner 220 may receive the video, audio, and data in a frequency domain corresponding a channel number (for example, cable broadcast number 24) corresponding to a user input (for example, a control signal received from the remote controller 100—a channel number input, a up-down input of a channel, and a channel input on an EPG screen—).

The tuner 220 may receive broadcast signals from various sources such as a terrestrial broadcast, a cable broadcast, a satellite broadcast, an Internet broadcast, etc. The tuner 220 may receive broadcast signals from a source like an analogue broadcast or a digital broadcast. The tuner 220 may be implemented in an all-in-one type along with the display apparatus 200, or may be implemented by using a separate device having a tuner electrically connected with the display apparatus 200 (for example, a set-top box (not shown), or a tuner (not shown) which is connected with the external input unit 260).

The communicator 230 may connect the display apparatus 200 to an external device (for example, a server) under the control of the controller 210. The controller 210 may download an application from the external device connected via the communicator 230 or may perform web browsing via the communicator 230. The communicator 230 may include one of a wired Ethernet 232, a wireless LAN 232, and short-range communication 233 according to the performance and configuration of the display apparatus 200. The communicator 230 may include a combination of the Ethernet 232, the wireless LAN 232, and the short-range communication 233.

The microphone 240 receives a user's uttered voice. The microphone 240 may convert the received voice into an electric signal and may output the electric signal to the controller. The user voice may include a voice corresponding to a menu or a function of the display apparatus 200, for example. It is advantageous that a distance from the microphone 240 to the user is within about 4m as a recognition range of the microphone 240. The recognition range of the microphone 240 may vary according to a volume of the user voice and a surrounding environment (for example, a speaker sound, an ambient noise).

The microphone 240 may be integrated into or separated from the display apparatus 200. The separated microphone 240 may be electrically connected with the display apparatus 200 via the communicator 230 or the external input unit 260.

The camera 245 receives a video (for example, consecutive frames) corresponding to a user's motion including a gesture within a camera recognition range. For example, the recognition range of the camera 245 may be a distance of about 0.5 to about 5 m from the camera 245 to the user. For example, the user motion may include a motion of a part of a user's body such as a user's face, look, hand, fist, and finger or a motion of a part of the user. The camera 245 converts the received video into an electric signal under the control of the controller and outputs the electric signal to the controller 220.

The controller may select a menu displayed on the display apparatus 200 by using a result of the motion recognition or may perform controlling according to a result of the motion recognition. For example, the controller may perform channel control, volume adjustment, and indicator movement.

The camera 245 may include a lens (not shown) and an image sensor (not shown). The camera 245 may support an optical zoom or digital zoom by using a plurality of lenses and image processing. The recognition range of the camera 245 may be set variously according to an angle of the camera and a surrounding environment condition. The camera 245 may in some exemplary embodiments include a plurality of cameras. When the camera 245 is provided in plural number, a 3D still image or a 3D motion may be received by using a first camera of the plurality of cameras and a neighboring second camera (not shown) (for example, located away from the first camera by a distance longer than about 2 cm and shorter than about 8 cm) of the plurality of cameras.

The camera 245 may be integrated into or separated from the display apparatus 200. A device (not shown) including the separated camera 245 may be electrically connected with the display apparatus 200 via the communicator 230 or external input unit 260.

The receiver 250 receives a signal (including a control signal) from the external remote controller 100 via a window (not shown). In some exemplary embodiments, the light receiver 250 may receive an optical signal via a light window. The receiver 250 may receive a signal corresponding to a user input (for example, a touch, a press, a touch gesture, a voice, or a motion) from the remote controller 100. The control signal may be extracted from the received optical signal. The extracted control signal may be transmitted to the controller.

The external input unit 260 receives a video (for example, a moving image, etc.), an audio (for example, a voice, music, etc.), and/or data (for example, a reproduction command) from an external source of the display apparatus 200 under the control of the controller. The external input unit 260 may include one of a High Definition Multimedia Interface (HDMI) input port 262, a component input jack 262, a PC input port 263, and/or a USB input jack 264. The external input unit 260 may include a combination of the HDMI input port 262, the component input jack 262, the PC input port 263, and the USB input jack 264.

The display 270 displays a video included in the broadcast signal received via the tuner 220 under the control of the controller. The display 270 may display a video which is input via the communicator 230 or the external input unit 260. The display 270 may output a video which is stored in the storage 280 under the control of the controller. The display 270 may display a voice UI (for example, including a voice command guide) to perform a voice recognition task corresponding to voice recognition, or a motion UI (for example, including a user motion guide for motion recognition) to perform a motion recognition task corresponding to motion recognition.

Figure 7A:
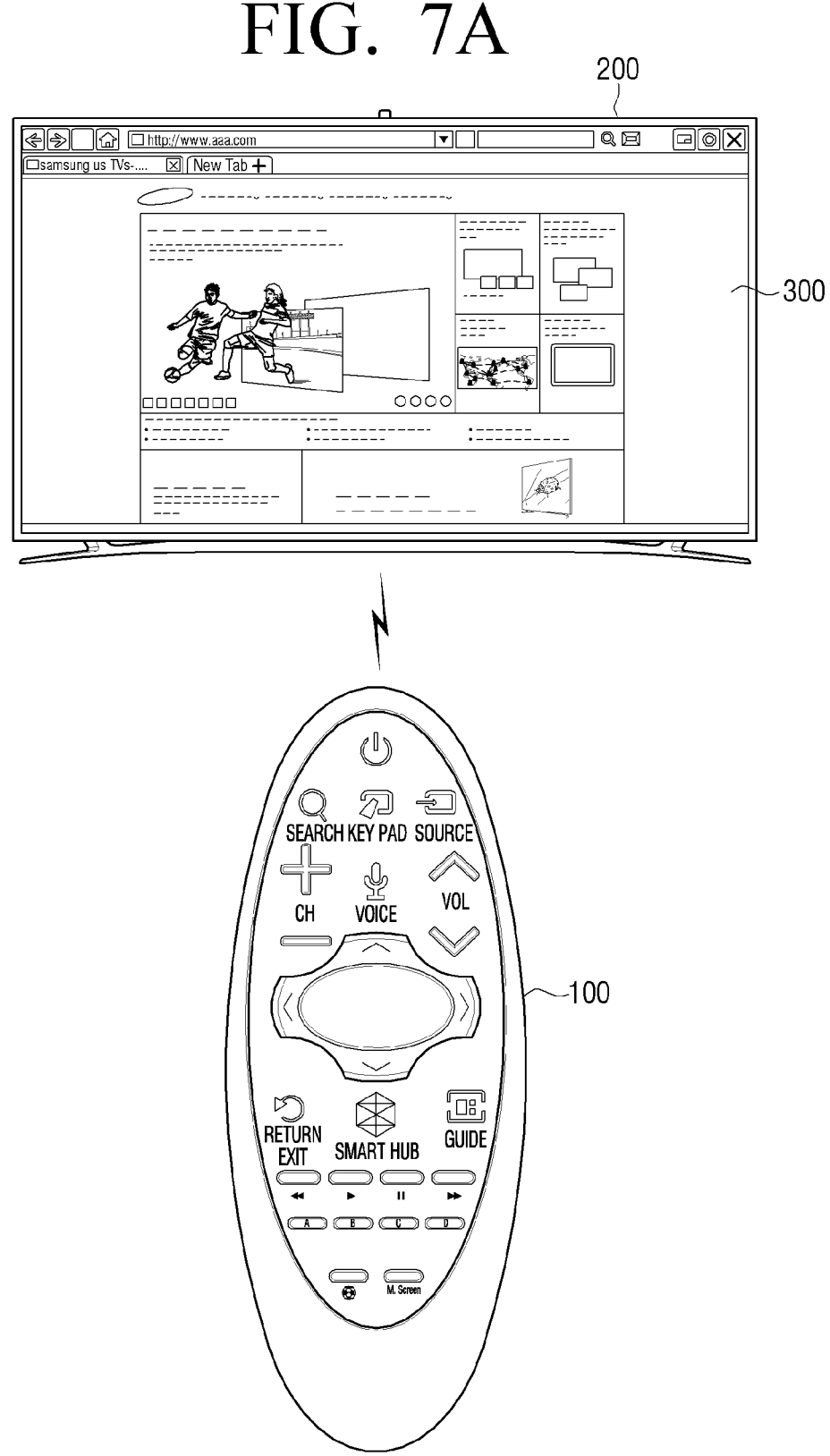

According to an exemplary embodiment, the display 270 may output visual feedback corresponding to a display of a content screen 300a on a first screen area 301 under the control of the controller of the display apparatus 200 (see, e.g., FIGS. 7A and 7B).

The audio output unit 275 outputs an audio included in the broadcast signal received via the tuner 220 under the control of the controller. The audio output unit 275 may output an audio (for example, a voice, a sound) which is input via the communicator 230 or the external input unit 260. The audio output unit 275 may output an audio which is stored in the storage 280 under the control of the controller. The audio output unit 275 may include at least one of a speaker 276, a headphone output terminal 277, and an S/PDIF output terminal 278. The audio output unit 275 may include a combination of the speaker 276, the headphone output terminal 277, and the S/PDIF output terminal 278.

According to an exemplary embodiment, the audio output unit 275 may output auditory feedback corresponding to a display of the content screen 300a on the first screen area 301 under the control of the controller of the display apparatus 200 (see, e.g., FIGS. 7A and 7B).

The storage 280 may store various data, programs, or applications for driving and controlling the display apparatus 200 under the control of the controller. The storage 280 may store signals or data which are input/output according to the driving of the tuner 220, the communicator 230, the microphone 240, the camera 245, the receiver 250, the external input unit 260, the display 270, the audio output unit 275, and/or the power supply 290. The storage 280 may store a control program for controlling the display apparatus 200 and the controller, an application which is initially provided by a manufacturer or downloaded from an external source, a GUI related to an application, an object for providing a GUI (for example, an image text, an icon, a button, etc.), user information, a document, databases, or related data.

The term "storage" used in the exemplary embodiments includes the storage 280, the ROM 222 and/or the RAM 223 of the controller, or a memory card (for example, a micro SD card, a USB memory, not shown) mounted in the display apparatus 200. The storage may include a non-volatile memory, a volatile memory, a hard disc drive (HDD) or a solid state drive (SSD).

Although not shown, the storage may include a broadcast receiving module, a channel control module, a volume control module, a communication control module, a voice recognition module, a motion recognition module, a light receiving module, a display control module, an audio control module, an external input control module, a power control module, a voice database (DB), or a motion database (DB). The modules of the storage which are not illustrated and the database may be implemented in the form of software to perform a broadcast reception control function, a channel control function, a volume control function, a communication control function, a voice recognition function, a motion recognition function, a light reception control function, a display control function, an audio control function, an external input control function, or a power control function of the display apparatus 200. The controller may perform each function by using those software elements stored in the storage.

The storage may store device information corresponding to the number of split screens.

The storage may store a size of each screen area corresponding to the number of split screens. The storage may store a reduction ratio of a content screen to be displayed on each screen area.

The storage may store numbers of colors 105a, 105b, 105c, and 105d corresponding to colors of the color key 105, and a time to display the number of the color on the screen (for example, 100 ms).

The storage may store each piece of control information received from the remote controller 100.

The storage may store a list of thumbnail content screens 405 (see, e.g., FIG. 8B). The storage may store sizes, locations, or intervals of the thumbnail content screens 405a to 405d to be displayed (see, e.g., FIG. 8B).

Figure 10A:
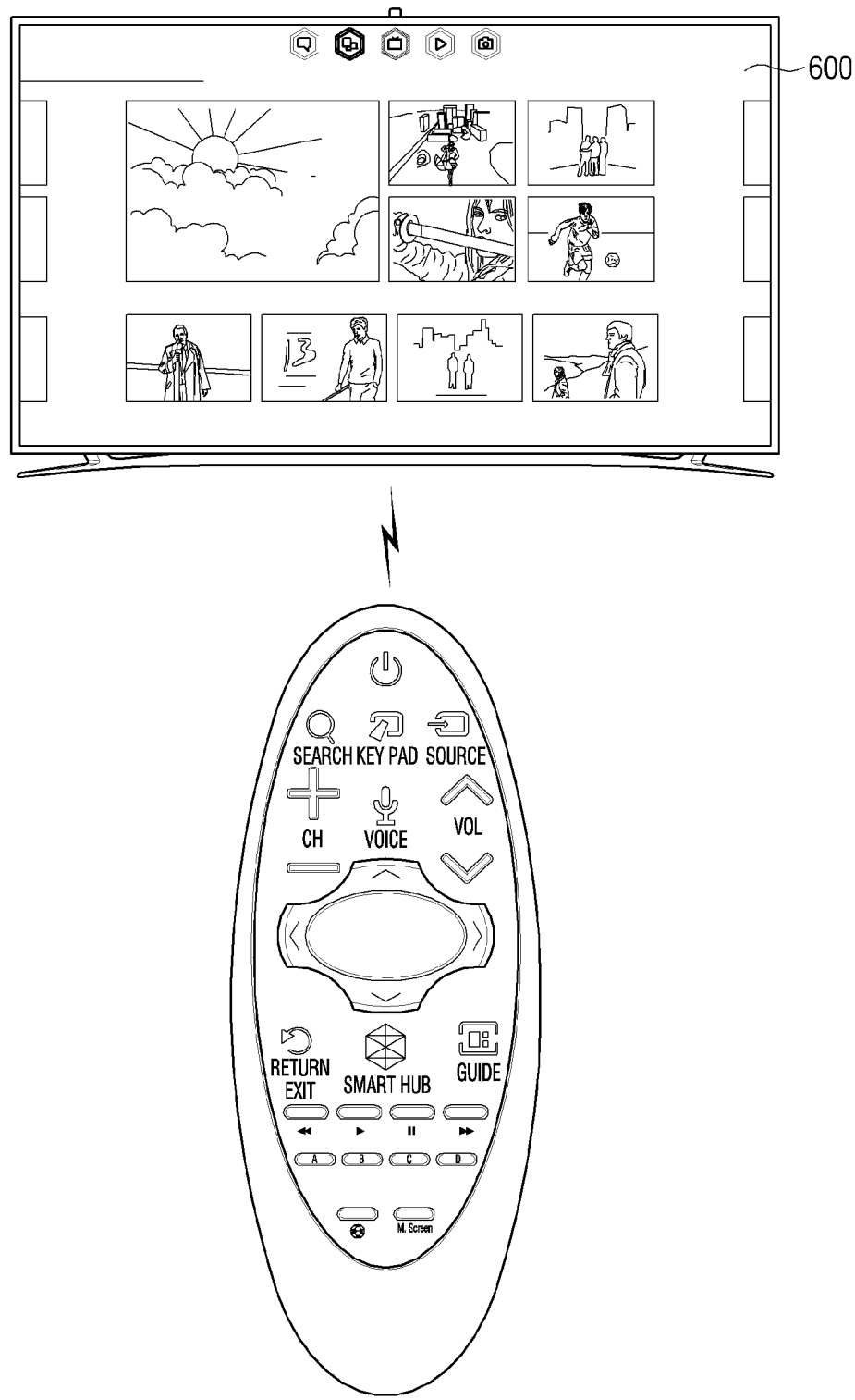
Figure 10B:
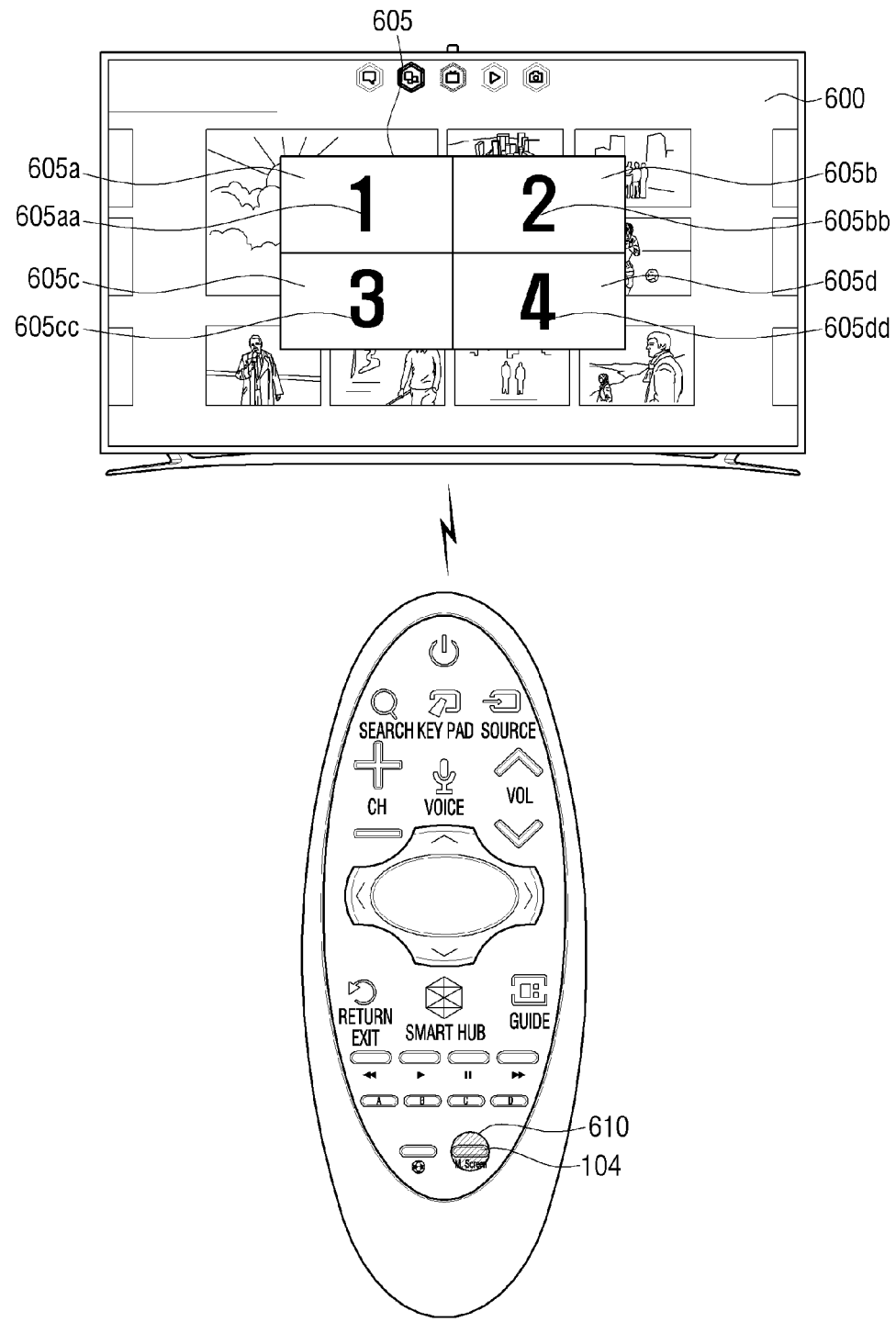

The storage unit may store a size, a location or an interval of a thumbnail screen area 605 (see, e.g., FIG. 10B).

The storage may store a moving image or an image corresponding to the visual feedback.

The storage may store a sound corresponding to the auditory feedback.

The power supply 290 supplies power input from an external power source to the internal elements 220 to 280 of the display apparatus 200 under the control of the controller. The power supply 290 may supply power input from one or two or more batteries (not shown) installed in the display apparatus 200 to the internal elements 220 to 280 under the control of the controller.

At least one element may be added to or deleted from the elements (for example, elements 220 to 290) of the display apparatus 200 shown in FIGS. 1B and 2 according to the performance of the display apparatus 200. In addition, it will be easily understood by an ordinary skilled person in the related art that locations of the elements (for example, elements 220 to 290) may be changed according to the performance or configuration of the display apparatus 200.

Figure 3:
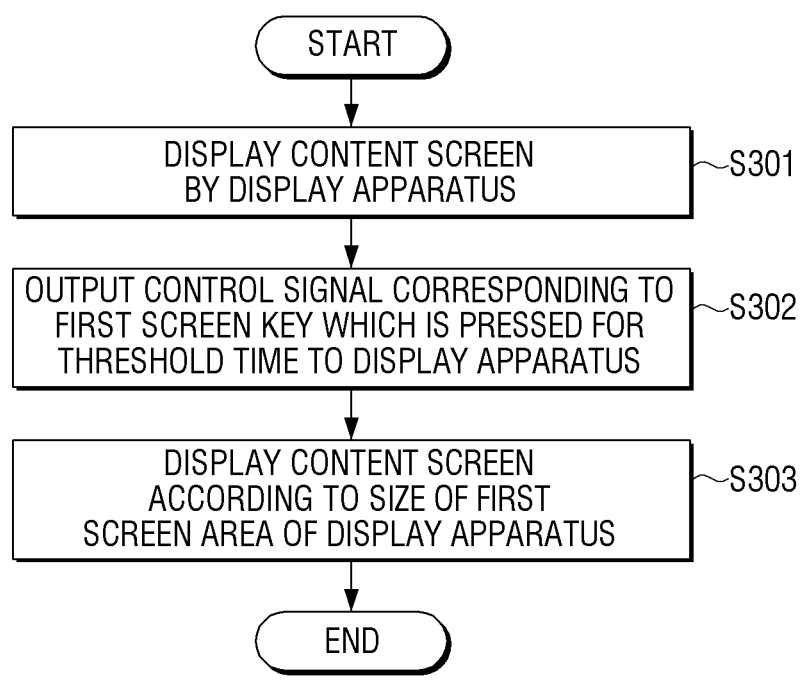
FIG. 3 is a flowchart schematically illustrating a method for controlling a screen of a remote controller according to an exemplary embodiment.

FIG. 3 is a flowchart schematically illustrating a method for controlling a screen of a remote controller according to an exemplary embodiment.

FIGS. 7A to 7C are views illustrating an example of the method of FIG. 3.

In operation S301 of FIG. 3, the display apparatus displays a content screen.

Referring to FIG. 7A, the display apparatus 100 displays a content screen 300 under the control of the controller. The content screen 300 may include a TV broadcast screen, a smart hub screen, a web page screen, or a screen of an application shortcut icon. The content screen 300 may be displayed by a user input which is input via one of the panel keys (not shown) of the remote controller 100 and the display apparatus 200. The term "user" used in the exemplary embodiments refers to a person who controls the function or operation of the display apparatus 100 by using the remote controller 100, and may include a user, a manager or an installation engineer.

In operation S302, a control signal corresponding to a first screen key which is pressed for a threshold time is output to the display apparatus. The threshold time may be predetermined.

Referring to FIG. 7B, in response to the red key 105a (first screen key) being selected by the user (310) for a threshold time, the controller outputs a first control signal corresponding to the red key 105a to the display apparatus 200 via the output interface 150. In addition or in the alternative, in response to the red key 105a (first screen key) being selected by the user (310) for the threshold time, the controller may transmit the first control signal corresponding to the red key 105a to the display apparatus 200 via the communicator 130.

The term "selecting a key" may refer to pressing a key, or touching a key, or contacting a key. The threshold time may be about 500 ms (changeable through a setting), for example. The threshold time for the first control signal is longer than a signal period from a first leader code of a remote control code format to a subsequent second leader code (for example, until a continuous code following the second leader code is output). That is, the first screen key is selected by the user for a sufficiently long time to allow the transmission of the remote control code. It will be easily understood by an ordinary skilled person in the related art that the threshold time may be changed according to a model or a manufacturer of the remote controller 100.

The display apparatus 200 receives the first control signal output from the remote controller 100 via the receiver 250. In addition or in the alternative, the display apparatus 200 may receive the first control signal output from the remote controller 100 via the communicator 230. The received first control signal may be stored in the storage of the display apparatus 200 under the control of the controller.

The controller of the display apparatus 200 may analyze the first control signal and may split the screen of the display apparatus 200. The first control signal may be a control signal corresponding a display of the content screen 300 on the first screen area 301 which is split from the screen of the display apparatus 200 (see, e.g., FIG. 7B).

Specifically, the controller of the display apparatus 200 may analyze the first control signal and may determine the number of split screens by using device information. The controller of the display apparatus 200 may determine a size of each screen corresponding to the number of split screens. The controller may determine a reduction ratio of the content screen 300 according to the size of each screen area. The controller of the display apparatus 200 may display a reduced content screen 300a on the first screen area 301 corresponding to the color key 105a.

The controller of the display apparatus 200 may split the screen of the display apparatus 200 by using one of a resolution of the display apparatus 200, a diagonal length of the screen, and/or an aspect ratio of the screen. For example, in response to the resolution of the display apparatus 200 being a UHD, the controller of the display apparatus 200 may split the screen of the display apparatus 200 into 4 screens. In response to the diagonal length of the screen of the display apparatus 200 being more than 100 cm, the controller of the display apparatus 200 may split the screen of the display apparatus 200 into 4 screens. In response to the aspect ratio of the screen of the display apparatus 200 being 16:9, the controller of the display apparatus 200 may split the screen of the display apparatus 200 into 4 screens.

The controller of the display apparatus 200 may display numbers 301a, 302a, 303a, and 304a in colors corresponding to the colors of the color key 105 on the four split screen areas 301 to 304 of the display apparatus 200 for a threshold time (for example, 100 ms). Thus, for example, the number "1" 301a may be displayed in red color to match the red color key 105a. The threshold time may be predetermined. In some exemplary embodiments, the controller of the display apparatus 200 may omit displaying the numbers 301a, 302a, 303a, and 304a in colors corresponding to the colors of the color key 105 on the four split screen areas 301 to 304 of the display apparatus 200.

The controller of the display apparatus 200 may display the four split screen areas 301 to 304 each having a different background color (not shown) corresponding to the colors of the respective color key 105. For example, the background color of the first screen area 301 may be red corresponding to the red color key 105a, the background color of the second screen area 302 may be green, the background color of the third screen area 303 may be yellow, or the background color of the fourth screen area 304 may be blue.

Figure 11:
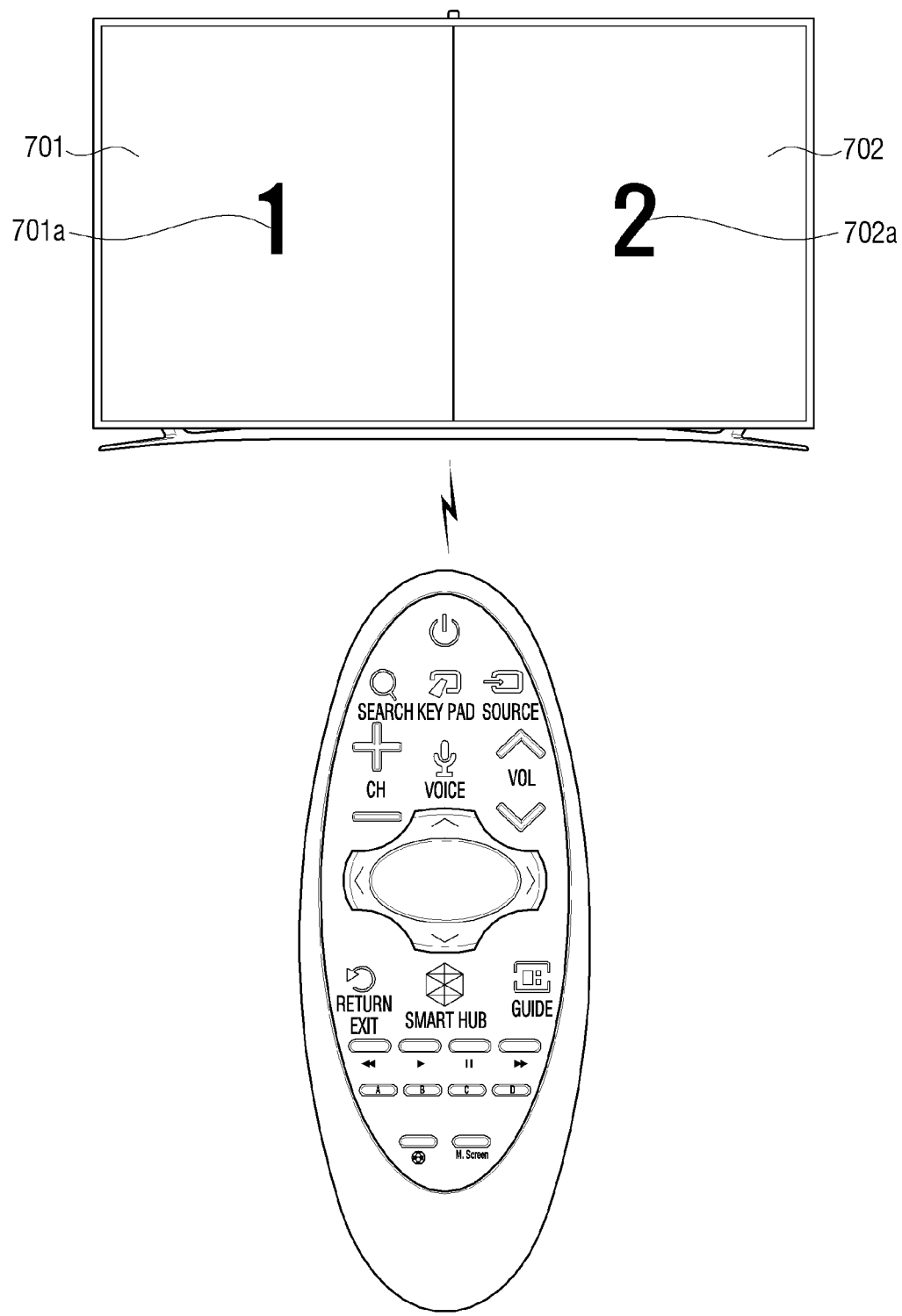
FIG. 11 is a view schematically illustrating an operation between a remote controller and a display apparatus according to another exemplary embodiment.

FIG. 11 is a view schematically illustrating an operation between a remote controller and a display apparatus according to another exemplary embodiment.

Referring to FIG. 11, the controller of the display apparatus 200 may display numbers 701a and 702a in colors corresponding to the colors of the color key 105 in two split screen areas 701 and 702 of the display apparatus 200. For example, the number "1" 701a may be red, and the number "2" 702a may be green. The controller of the display apparatus 200 may display the two split screen areas 701 and 702 each having a different background color (not shown) corresponding to the colors of the color key 105. For example, the background color of the first screen area 701 may be red and the background color of the second screen area 702 may be green.

Referring back to FIG. 3, in operation S303, the display apparatus displays the content screen according to the size of the first screen area.

Referring to FIG. 7C, the controller of the display apparatus 200 displays the reduced content screen 300a on a first split screen of the 4 split screens of the display apparatus 200. The reduction ratio of the content screen 300a may correspond to the size of the first screen area 301 (see FIG. 7B). For example, in response to the size of the first screen area 301 being 25% of the screen of the display apparatus 200, the controller of the display apparatus 200 may display the content screen 300a which is reduced by 25% in the first screen area 301. In addition, in response to the size of the first screen area 301 being 25% of the screen of the display apparatus 200, the controller of the display apparatus 200 may display the content screen 300a which is reduced by 26% (for example, reduced by about 26~40%) in comparison with the original screen by removing at least one of the upper, lower, left, and right margins of the content screen 300.

In response to another color key (105b to 105d) of the remote controller 100 being selected by the user, the controller may output another control signal to the display apparatus 200.

The controller of the display apparatus 200 may output visual feedback (for example, a moving image or an image stored in the storage) corresponding to the display of the content screen 300a on the first screen area 301 on the screen of the display apparatus 200.

The controller of the display apparatus 200 may output auditory feedback (for example, a sound stored in the storage) corresponding to the display of the reduced content screen 300a on the first screen area 301 via the audio output unit 275.

The controller of the display apparatus 200 may display a reduced content screen of another content screen (not shown) on the second screen area 302 to the fourth screen area 304 according to each control signal received (see FIG. 7B).

In response to the reduced content screen 300a being displayed on the first screen area 301 in operation 303 of FIG. 3, the method for controlling the screen of the remote controller 100 is finished.

Figure 4:
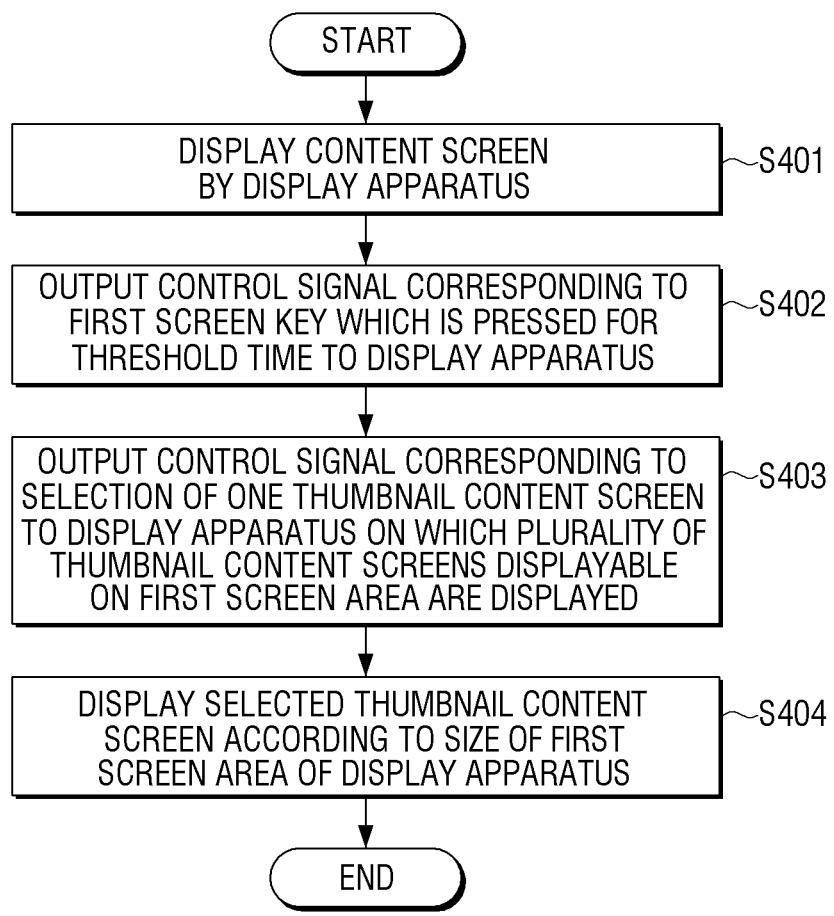
FIG. 4 is a flowchart schematically illustrating a method for controlling a screen of a remote controller according to another exemplary embodiment.

FIG. 4 is a flowchart schematically illustrating a method for controlling a screen of a remote controller according to another exemplary embodiment.

FIGS. 8A to 8D are views illustrating an example of the method of FIG. 4.

In operation S401 of FIG. 4, the display apparatus displays a content screen.

Referring to FIG. 8A, the display apparatus 100 displays a content screen 400 under the control of the controller. The content screen 400 may include a TV broadcast screen, a smart hub screen, a web page screen, and/or a screen of an application shortcut icon. The content screen 400 may be displayed by a user input which is input via one of the panel keys (not shown) of the remote controller 100 and the display apparatus 200.

In operation S402, a control signal corresponding to a first screen key which is pressed for a threshold time is output to the display apparatus.

Referring to FIG. 8B, in response to the red key 105a (first screen key) being selected by the user (410) for a threshold time (for example, 500 ms, changeable through setting), the controller outputs a control signal corresponding to the red key 105a to the display apparatus 200 via the output interface 150. In addition or in the alternative, in response to the red key 105a (first screen key) being selected by the user (410) for the threshold time, the controller may transmit the control signal corresponding to the red key 105a to the display apparatus 200 via the communicator 130.

The display apparatus 200 receives the control signal output from the remote controller 100 via the receiver 250. In addition or in the alternative, the display apparatus 200 may receive the control signal output from the remote controller 100 via the communicator 230. The received control signal may be stored in the storage of the display apparatus 200 under the control of the controller.

The controller of the display apparatus 200 may analyze the control signal and may split the screen of the display apparatus 200. The control signal may be a control signal corresponding a display of one or two or more thumbnail content screens which are displayable on the first screen area 401.

Specifically, the controller of the display apparatus 200 may analyze the control signal and may determine the number of split screens by using device information. The controller of the display apparatus 200 may determine a size of each screen corresponding to the number of split screens. The controller may determine a reduction ratio of the content screen 300 according to the size of each screen area. The controller of the display apparatus 200 may determine one or two or more thumbnail content screens which are displayable on the first screen area 401. The controller of the display apparatus 200 may determine a display location (for example, a center, left, right, top and bottom), a size (for example, 640×340, or 344×258, changeable), and an interval of the thumbnails of the thumbnail content screen. The controller of the display apparatus 200 may display the one or two or more thumbnail content screens by using the determined display location, size, and interval of the thumbnail content screen. In addition, a size of each of the thumbnail content screens 405a to 405d may be smaller than the size of the first screen area 401. For example, the size of each of the thumbnail content screens 405a to 405d may be about 20~90% of the size of the first screen area 401. The size of at least one of the thumbnail content screens 405a to 405d may be smaller than the size of the first screen area 401.

The controller of the display apparatus 200 may determine a thumbnail content 405 to be displayed on the screen of the display apparatus 200. The thumbnail content 405 may be determined by manufacturer's setting or user's setting. The thumbnail content 405 may include a TV broadcast, a smart hub, a web page, or an executed application. The thumbnail content 405 may have priority. The thumbnail content having the priority may be displayed preferentially in comparison with other thumbnail contents.

The controller of the display apparatus 200 may display the thumbnail content screens 405a to 405d corresponding to the determined thumbnail contents on the four split screens of the display apparatus 200 by overlapping the thumbnail contents screens 405a to 405d. The determined thumbnail content screens, for example, the home page 405a, the TV broadcast 405b, the On TV 405c, and the application screen 405d, may be displayed on a center area of the screen one on another (see, e.g., FIG. 8B).

The controller of the display apparatus 200 may display numbers 401a, 402a, 403a, and 404a in colors corresponding to the colors of the color key 105 on the four split screen areas 401 to 404 of the display apparatus 200 for a threshold time (for example, 100 ms). The threshold time may be predetermined. For example, the controller may display the number "1" 401a in red corresponding to the red color key 105a, and display the number "2" 402a in green corresponding to the green color key 105b, etc. Alternatively, in some exemplary embodiments, the controller of the display apparatus 200 may omit displaying the numbers 401a, 402a, 403a, and 404a in colors corresponding to the colors of the color key 105 on the four split screen areas 401 to 404 of the display apparatus 200.

In some exemplary embodiments, the controller of the display apparatus 200 may display the four split screen areas 401 to 404 each having a different background color (not shown) corresponding to the colors of the color key 105. For example, the background color of the first screen area 401 may be red, the background color of the second screen area 402 may be green, the background color of the third screen area 403 may be yellow, and/or the background color of the fourth screen area 404 may be blue.

The output of the control signal in operation S402 of FIG. 4 is substantially identical to the output of the control signal in operation S302 of FIG. 3 and thus a redundant explanation is omitted.

In operation S403 of FIG. 4, a control signal corresponding to a selection of one thumbnail content screen is output to the display apparatus on which the one or two or more thumbnail content screens displayable on the first screen area are displayed.

Figure 8C:
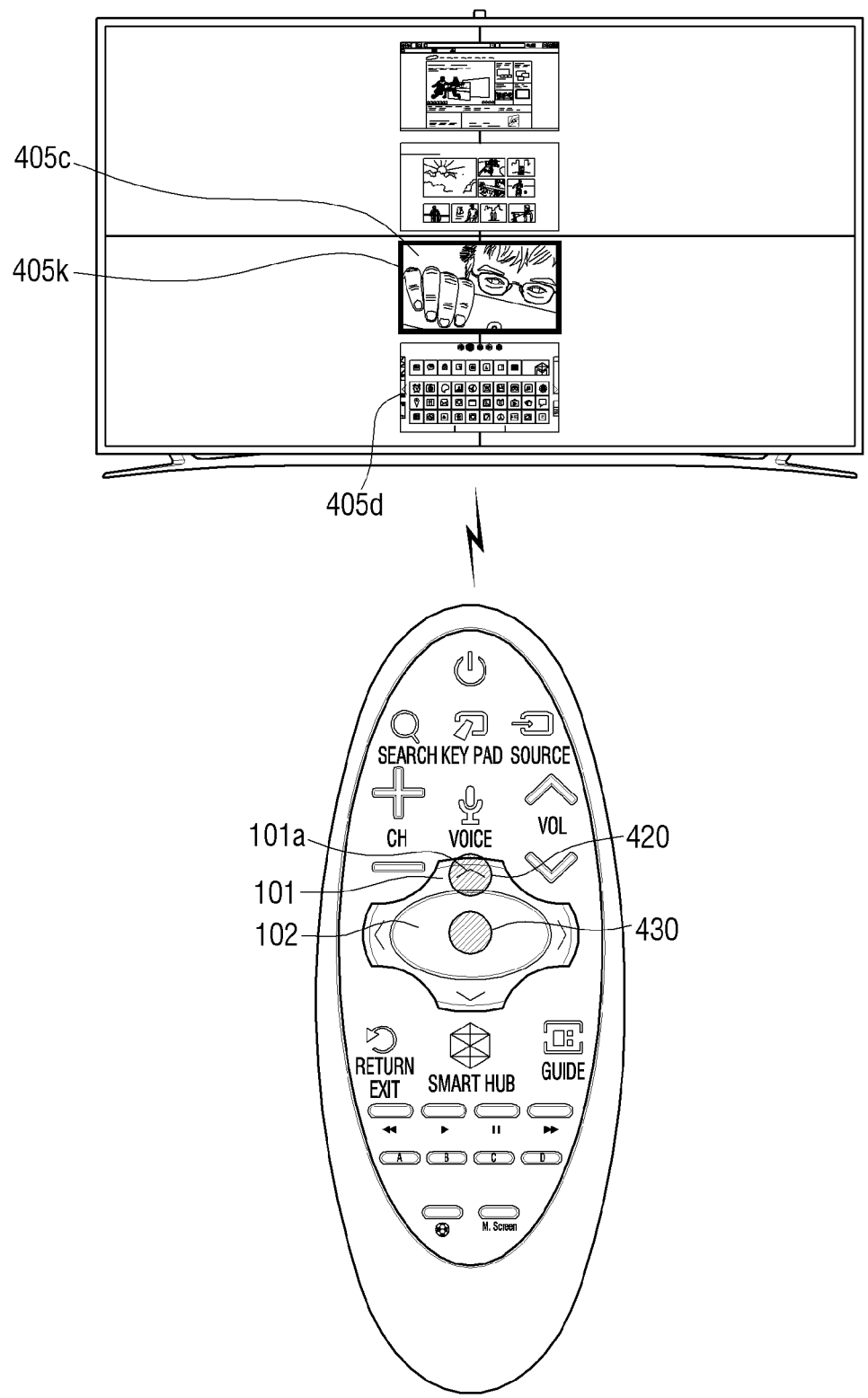

For example, referring to FIG. 8C, in response to an up arrow key 101a of a direction key 101 being selected by the user (420), the controller outputs a control signal corresponding to the up arrow key 101a to the display apparatus

200. In response to the up arrow key 101*a* being selected by the user once, the controller may output the control signal to the display apparatus 200 once. In addition, in response to the up arrow key 101*a* being selected by the user for a threshold time, the controller may continuously output the control signal to the display apparatus 200. The threshold time may be predetermined.

The controller of the display apparatus 200 receives the control signal output from the remote controller 100 via one of the communicator 230 and the receiver 250. The received control signal may be stored in the storage.

The controller of the display apparatus 200 may analyze the control signal and may move a cursor 405*k* (illustrated as a highlighted border) upwards on the screen of the display apparatus 200. The control signal may be a control signal corresponding to a movement of cursor 405*k*. The control signal may include a control signal corresponding to an initial display of the cursor 405*a* on the screen of the display apparatus 200. For example, as shown in FIG. 8C, the controller of the display apparatus 200 may display the cursor 405*k* on the thumbnail content screen 405*c* according to the received control signal.

In response to the touch pad 102 being selected by the user (430), the controller outputs a control signal corresponding to the selection of the touch pad 102 to the display apparatus 200. In addition, in response to a key 106 other than the touch pad 102 being selected by the user, the controller may output a control signal corresponding to the selection of the key 106 to the display apparatus 200.

The controller of the display apparatus 200 receives the control signal output from the remote controller 100 via one of the communicator 230 and the receiver 250. The received control signal may be stored in the storage.

The controller of the display apparatus 200 may analyze the control signal and recognize that the thumbnail content screen 405*c* is selected on the screen of the display apparatus 200. The control signal may be a control signal corresponding to a display of the thumbnail content screen 405*c* on the first screen area 401.

The controller of the display apparatus 200 may determine that the selected thumbnail content screen 405*c* is displayed on the first screen area 401 of the four split screens of the display apparatus 200. The controller of the display apparatus 200 may scale (enlarge or reduce) the original content screen of the thumbnail content screen 405*c* to correspond to the size of the first screen area 401. (While FIG. 9A refers to another exemplary embodiment, FIG. 9A shows an original content screen 500 corresponding to the thumbnail content screen 405*c*, and this original content screen 500 is scaled for display in first screen area 401 as shown in FIG. 8D.)

In operation 404 of FIG. 4, the display apparatus displays the selected thumbnail content screen according to the size of the first screen area.

Figure 8D:
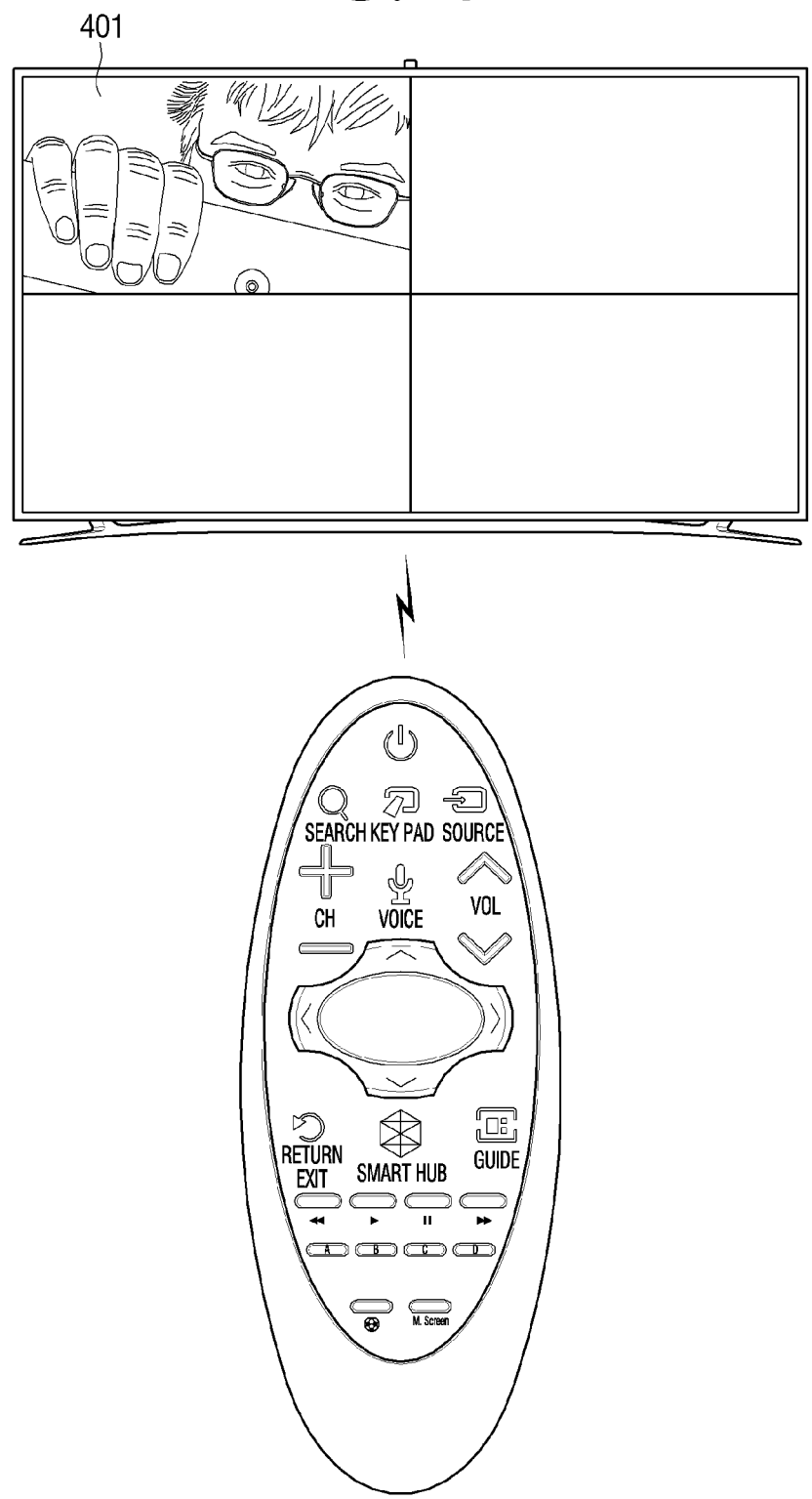
Figure 9A:
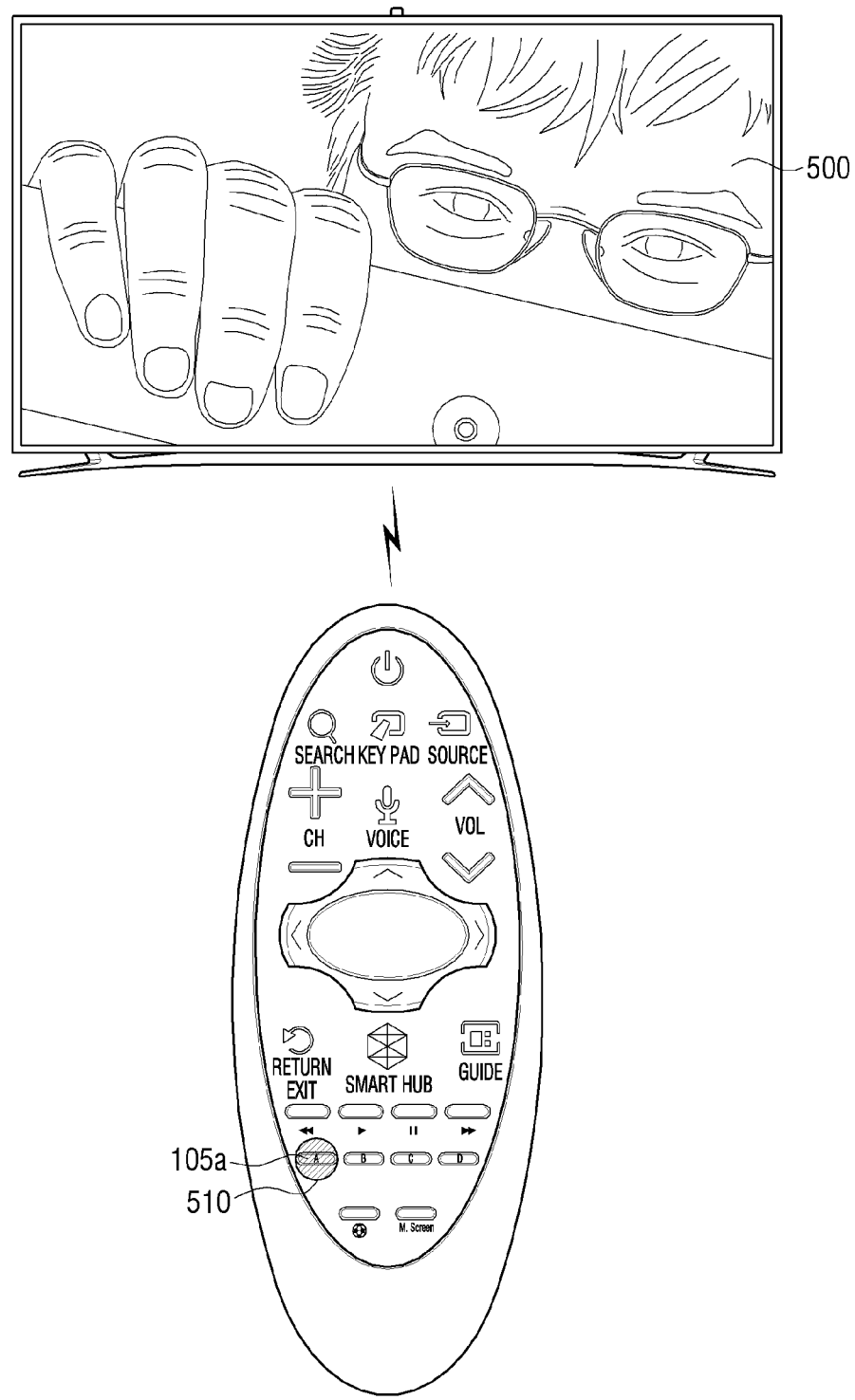

For example, referring to FIG. 8D, the controller of the display apparatus 200 displays the selected thumbnail content screen 405*c* on the first screen area 401 of the 4 split screens of the display apparatus 200. The scaling ratio of the thumbnail content screen 405*c* may correspond to the size of the first screen area 401. For example, in response to the size of the first screen area 401 being 25% of the screen of the display apparatus 200, the controller of the display apparatus 200 may scale the original content screen (see FIG. 9A and parenthetical note above) by 25% and display the scaled screen on the first screen area 401. In addition, in response to the size of the first screen area 401 being 25% of the screen of the display apparatus 200, the controller of the display apparatus 200 may display the original content screen (see FIG. 9A and parenthetical note above), which is scaled by more than 26% (for example, about 26~40%) in comparison with the original screen by removing at least one of the upper, lower, left, and right margins of the original content screen, on the first screen area 401 (see FIG. 9A and parenthetical note above).

In response to another color key (105*b* to 105*d*) of the remote controller 100 being selected by the user, the controller may output another control signal to the display apparatus 200.

The controller of the display apparatus 200 may output visual feedback (for example, a moving image or an image stored in the storage) corresponding to the display of the thumbnail content screen 405*c* on the first screen area 401 on the screen of the display apparatus 200.

The controller of the display apparatus 200 may output auditory feedback (for example, a sound stored in the storage) corresponding to the display of the thumbnail content screen 405*c* on the first screen area 401 via the audio output unit 275.

The controller of the display apparatus 200 may scale other thumbnail content screens 405*a*, 405*b*, and 405*d* and display them on the second screen area 402 to the fourth screen area 404 according to each control signal received.

In response to the original thumbnail screen (see FIG. 9A and parenthetical note above) corresponding to the selected thumbnail content screen being scaled and displayed on the first screen area 401 in operation 404 of FIG. 4, the method for controlling the screen of the remote controller 100 is finished.

Figure 5:
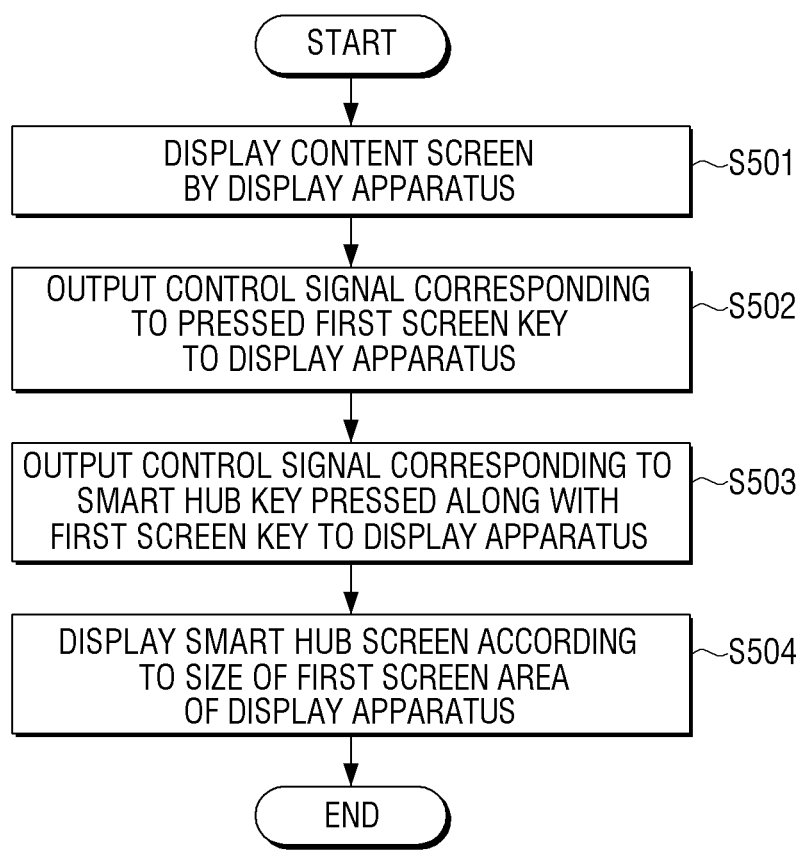
FIG. 5 is a flowchart schematically illustrating a method for controlling a screen of a remote controller according to yet another exemplary embodiment.

FIG. 5 is a flowchart schematically illustrating a method for controlling a screen of a remote controller according to another exemplary embodiment.

FIGS. 9A to 9C are views illustrating an example of the method of FIG. 5.

In operation S501 of FIG. 5, the display apparatus displays a content screen.

Referring to FIG. 9A, the display apparatus 100 displays a content screen 500 under the control of the controller. The content screen 500 may include a TV broadcast screen, a smart hub screen, a web page screen, or a screen of an application shortcut icon. In operation S501 of FIG. 5, the content screen 500 may be the TV broadcast screen. The content screen 500 may be displayed by a user input which is input via one of the panel keys (not shown) of the remote controller 100 and the display apparatus 200.

In operation S502, a control signal corresponding to a first screen key which is pressed is output to the display apparatus.

Referring to FIG. 9A, in response to the red key 105*a* (first screen key) being selected by the user (510), the controller outputs a control signal corresponding to the red key 105*a* to the display apparatus 200 via one of the communicator 130 and the output interface 150.

The display apparatus 200 receives the control signal output from the remote controller 100 via one of the communicator 230 and the receiver 250. The received control signal may be stored in the storage under the control of the controller of the display apparatus 200.

The controller of the display apparatus 200 may analyze the control signal and may split the screen of the display apparatus 200. The control signal may be a control signal which is output to the display apparatus 200 preferentially in order to display a content screen corresponding to a subsequent control signal on a first screen area 501 of the split screens of the display apparatus 200 (see FIG. 9B).

Specifically, the controller of the display apparatus 200 may analyze the control signal and may determine the number of split screens by using device information. The controller of the display apparatus 200 may determine a size of each screen corresponding to the number of split screens. The controller may determine a reduction ratio of the content screen (corresponding to the control signal) according to the size of each screen area.

The controller of the display apparatus 200 may display numbers 501a, 502a, 503a, and 504a in colors corresponding to the colors of the color key 105 on the four split screen areas 501 to 504 of the display apparatus 200 for a threshold time (for example, 100 ms). The threshold time may be predetermined. For example, the controller may display the number "1" 501a in red, and the number "2" in green, etc. In some exemplary embodiments, the controller of the display apparatus 200 may omit displaying the numbers 501a, 502a, 503a, and 504a of the colors corresponding to the colors of the color key 105 on the four split screen areas 501 to 504 of the display apparatus 200.

In some exemplary embodiments, the controller of the display apparatus 200 may display the four split screen areas 501 to 504 each with a different background color (not shown) corresponding to the colors of the color key 105. For example, the background color of the first screen area 501 may be red, the background color of the second screen area 502 may be green, the background color of the third screen area 503 may be yellow, and/or the background color of the fourth screen area 504 may be blue.

The output of the control signal in operation S502 of FIG. 5 is substantially identical to the output of the control signal in operation S302 of FIG. 3 and thus a redundant explanation is omitted.

In operation S503 of FIG. 5, a control signal corresponding to a smart hub key which is pressed along with the first screen key is output to the display apparatus.

For example, referring to FIG. 9B, in response to the first screen key 105a being selected (510) and the smart hub key 103 being selected (520) by the user, the controller outputs the control signal corresponding to the smart hub key 103 to the display apparatus 200 via one of the communicator 130 and the output interface 150.

The display apparatus 200 receives the control signal output from the remote controller 100 via one of the communicator 230 and the receiver 250. The received control signal may be stored in the storage under the control of the controller of the display apparatus 200.

The controller of the display apparatus 200 may analyze the received control signal. The control signal may be a control signal corresponding to a display of a smart hub screen 550 corresponding the smart hub key 103 on the first screen area 501 (see FIG. 9C). The controller of the display apparatus 200 may determine a reduction ratio of the smart hub screen 550 displayed on the first screen area 501.

In operation 504 of FIG. 5, the display apparatus displays the smart hub screen according to the size of the first screen area.

Referring to FIG. 9C, the controller of the display apparatus 200 displays the smart hub screen 550 on the first screen area of the 4 split screens of the display apparatus 200. The reduction ratio of the smart hub screen 550 may correspond to the size of the first screen area 501. For example, in response to the size of the first screen area 501 being 25% of the screen of the display apparatus 200, the controller of the display apparatus 200 may display the smart hub screen 550 which is reduced by 25% on the first screen area 501. In response to the size of the first screen area 501 being 25% of the screen of the display apparatus 200, the controller of the display apparatus 200 may display the smart hub screen 550 which is reduced by more than 26% (for example, about 26~40%) in comparison with the original screen by removing at least one of the upper, lower, left, and right margins of the smart hub screen 550.

In response to another color key (105b to 105d) of the remote controller 100 being selected by the user, the controller may output another control signal to the display apparatus 200.

The controller of the display apparatus 200 may output visual feedback (for example, a moving image or an image stored in the storage) corresponding to the display of the smart hub screen 550 on the first screen area 501 on the screen of the display apparatus 200.

The controller of the display apparatus 200 may output auditory feedback (for example, a sound stored in the storage) corresponding to the display of the smart hub screen 550 on the first screen area 501 via the audio output unit 275.

The controller of the display apparatus 200 may display a reduced content screen of another content screen (not shown) on the second screen area 502 to the fourth screen area 504 according to each control signal received.

In response to the smart hub screen 550 being displayed on the first screen area 501 in operation 504 of FIG. 5, the method for controlling the screen of the remote controller 100 is finished.

Figure 6:
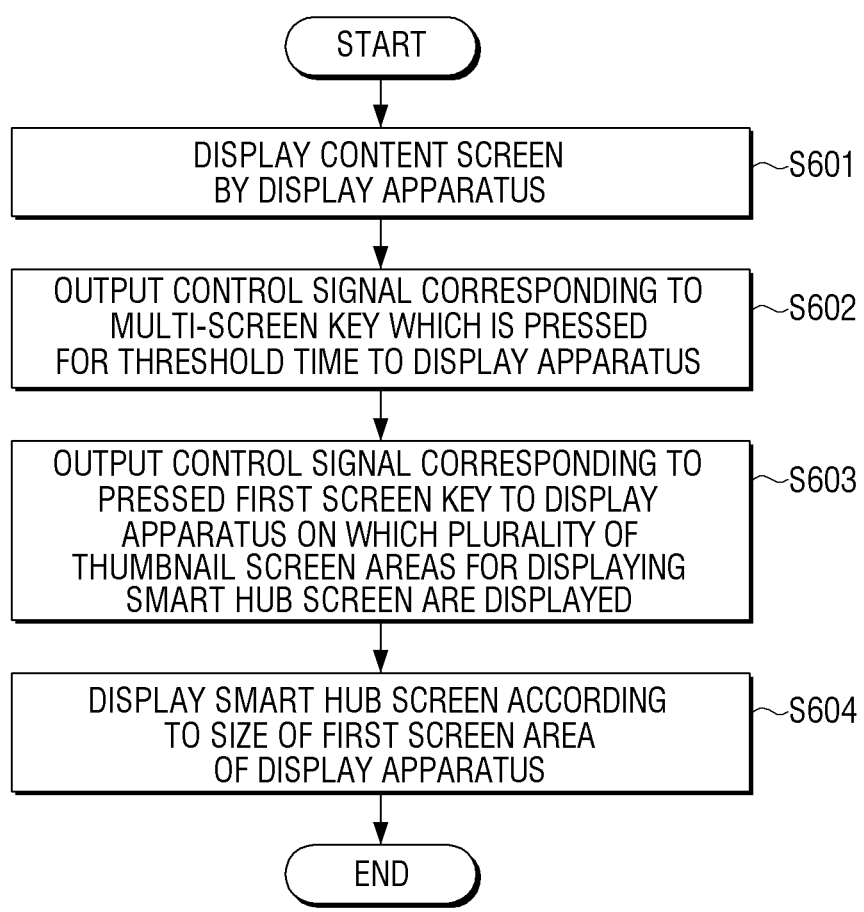
FIG. 6 is a flowchart schematically illustrating a method for controlling a screen of a remote controller according to yet another exemplary embodiment.

FIG. 6 is a flowchart schematically illustrating a method for controlling a screen of a remote controller according to another exemplary embodiment.

FIGS. 10A to 10D are views illustrating an example of the method of FIG. 6.

In operation S601 of FIG. 6, the display apparatus displays a content screen.

Referring to FIG. 10A, the display apparatus 100 displays a content screen 600 under the control of the controller. The content screen 600 may include a TV broadcast screen, a smart hub screen, a web page screen, or a screen of an application shortcut icon. In operation S601 of FIG. 6 as shown in FIG. 10A, the content screen 600 may be the smart hub screen. The content screen 600 may be displayed by a user input which is input via one of the panel keys (not shown) of the remote controller 100 and the display apparatus 200.

In operation S602 of FIG. 6, a control signal corresponding to a multi-screen key which is pressed for a threshold time is output to the display apparatus. The threshold time may be predetermined.

For example, referring to FIG. 10B, in response to the multi screen key 104 being selected by the user (610) for the threshold time (for example, 500 ms, changeable through setting), the controller outputs a control signal corresponding to the multi screen key 104 to the display apparatus 200 via one of the communicator 130 and the output interface 150.

The display apparatus 200 receives the control signal output from the remote controller 100 via one of the communicator 230 and the receiver 250. The received control signal may be stored in the storage under the control of the controller of the display apparatus 200.

The controller of the display apparatus 200 may analyze the received control signal and may display a thumbnail screen area 605 on the screen of the display apparatus 200. The control signal may be a control signal which is output to the display apparatus 200 preferentially in order to display the smart hub screen 600 corresponding to a subsequent control signal on one of the screen areas 605*a* to 605*d* of the thumbnail screen area 605.

Specifically, the controller of the display apparatus 200 may analyze the control signal and may determine the number of thumbnail screen areas 605 by using device information. The controller of the display apparatus 200 may determine a size of each thumbnail screen area corresponding to the number of thumbnail screen areas 605. The controller may determine a reduction ratio of the smart hub screen 600 according to the size of each thumbnail screen area. The controller of the display apparatus 200 may determine a display location (for example, a center, left, right, top and bottom), a size (for example, 904×424, or 602×282, changeable), and/or an interval of the thumbnail screen area 605. The controller of the display apparatus 200 may display two or more thumbnail screen areas 605 by using the determined display location, size, and interval of the thumbnail screen area 605.

A size of each of the thumbnail screen areas 605*a* to 605*d* may be smaller than the size of the first screen area 601. For example, the size of each of the thumbnail screen areas 605*a* to 605*d* may be about 15~90% of the size of the first screen area 601. The size of at least one of the thumbnail screen areas 605*a* to 605*d* may be smaller than the size of the first screen area 601.

The controller of the display apparatus 200 may display the thumbnail screen areas 605*a* to 605*d* by superimposing the thumbnail screen areas 605*a* to 605*d* on the smart hub screen of the display apparatus 200. The controller of the display apparatus 200 may display numbers 605*aa*, 605*bb*, 605*cc*, and 605*dd* in colors corresponding to the colors of the color key 105 on the four split thumbnail screen areas 605*a* to 605*d* of the display apparatus 200 for a threshold time (for example, 100 ms). The threshold time may be predetermined. For example, the controller may display the number "1" 605*aa* in red, and the number "2" 605*bb* in green, etc. In some exemplary embodiments, the controller of the display apparatus 200 may omit displaying the numbers 605*aa*, 605*bb*, 605*cc*, and 605*dd* in colors corresponding to the colors of the color key 105 on the four split thumbnail screen areas 605*a* to 605*d* of the display apparatus 200.

In some exemplary embodiments, the controller of the display apparatus 200 may display the four split thumbnail screen areas 605*a* to 605*d* each with a different background color (not shown) corresponding to the colors of the color key 105. For example, the background color of the first screen area 605*a* may be red, the background color of the second screen area 605*b* may be green, the background color of the third screen area 605*c* may be yellow, and/or the background color of the fourth screen area 605*d* may be blue.

In operation S603 of FIG. 4, a control signal corresponding to the pressed first screen key is output to the display apparatus on which the thumbnail screen area for displaying the smart hub screen is displayed.

Figure 10C:
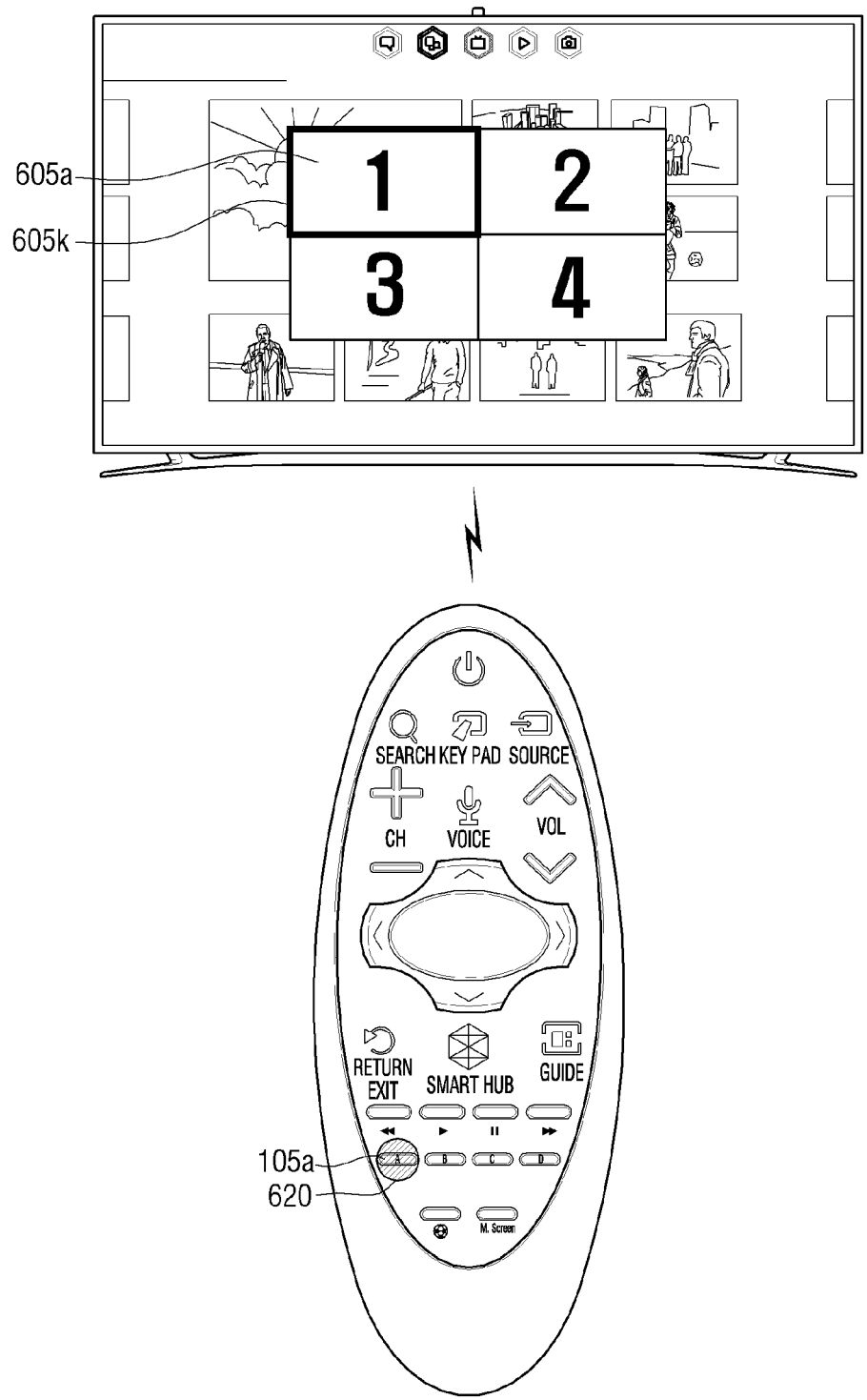

Referring to FIG. 10C, in response to the red key 105*a* being selected by the user (620), the controller outputs a control signal corresponding to the red key 105*a* to the display apparatus 200 via one of the communicator 130 and the output interface 150.

The controller of the display apparatus 200 may analyze the control signal and may select the first thumbnail screen area 605*a* on the thumbnail screen area 605. The control signal may be a control signal corresponding to a display of the smart hub screen 600 on the first thumbnail screen area 605*a* of the thumbnail screen area 605. The controller of the display apparatus 200 may display a cursor 605*k* (in this exemplary embodiment, displayed as a highlighted border) on the first thumbnail screen area 605*a* according to the control signal.

The controller of the display apparatus 200 may display a reduced smart hub screen 600 on the first thumbnail screen area 605*a* of the thumbnail screen area 605 corresponding to the color key 105*a*.

In operation 604 of FIG. 6, the display apparatus displays the smart hub screen according to the size of the first screen area.

For example, referring to FIG. 10D, the controller of the display apparatus 200 displays the reduced smart hub screen 600*a* on the first screen area of the 4 split screens of the display apparatus 200. The reduction ratio of the smart hub screen 600*a* may correspond to the size of the first screen area 601. For example, in response to the size of the first screen area 601 being 25% of the screen of the display apparatus 200, the controller of the display apparatus 200 may display the smart hub screen 600*a* which is reduced by 25% on the first screen area 601. In addition, in response to the size of the first screen area 601 being 25% of the screen of the display apparatus 200, the controller of the display apparatus 200 may display the smart hub screen 600*a* which is reduced by more than 26% (for example, about 26~40%) in comparison with the original screen by removing at least one of the upper, lower, left, and right margins of the smart hub screen 600.

In response to another color key (105*b* to 105*d*) of the remote controller 100 being selected by the user, the controller may output another control signal to the display apparatus 200.

The controller of the display apparatus 200 may output visual feedback (for example, a moving image or an image stored in the storage) corresponding to the display of the reduced smart hub screen 600*a* on the first screen area 601 on the screen of the display apparatus 200.

The controller of the display apparatus 200 may output auditory feedback (for example, a sound stored in the storage) corresponding to the display of the reduced smart hub screen 600*a* on the first screen area 601 via the audio output unit 275.

The controller of the display apparatus 200 may display a reduced content screen of another content screen (not shown) on the second screen area 602 to the fourth screen area 604 according to each control signal received.

In response to the reduced smart hub screen 600*a* being displayed on the first screen area 601 in operation 604 of FIG. 6, the method for controlling the screen of the remote controller 100 is finished.

The methods according to the exemplary embodiments may be implemented in the form of a program command executable through various computing means and may be recorded on a computer-readable medium. The computer-readable medium may include a program command, a data file, and a data structure separately or a combination thereof. For example, the computer-readable medium may be stored in a volatile or non-volatile storage device such as a ROM, a memory such as a RAM, a memory chip, a device, or an integrated chip, or a storage medium which can record optically or magnetically and also is readable by a device (for example, a computer), such as a CD, a DVD, a magnetic disk, or a magnetic tape, regardless of whether it is deletable or re-recordable. A memory included in a mobile terminal may be an example of a computer-readable storage medium suitable for storing a program or programs including instructions for implementing the exemplary embodiments. The program command recorded on the medium may be specially designed and configured for the present disclosure or may be well known to an ordinary skilled person in the computer software field and usable.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
   a display;
   a receiver configured to receive a control signal from a remote controller, the control signal corresponding to one of a plurality of screen keys provided on the remote controller; and
   a controller configured to:
   in response to the control signal being received from the remote controller while displaying a content image in a one screen mode on the display,
   change a display mode from the one screen mode to a plurality of screen areas mode, scale the content image that is displayed for display in a first screen area among the plurality of screen areas of the plurality of screen areas mode, and display the scaled content image in the first screen area when the received control signal corresponds to a first screen key among the plurality of screen keys, and
   change the display mode from the one screen mode to the plurality of screen areas mode, scale the content image that is displayed for display in a second screen area among the plurality of screen areas that is different than the first screen area, and display the scaled content image in the second screen area when the received control signal corresponds to a second screen key among the plurality of screen keys,
   wherein each of the plurality of screen areas corresponds to a respective one of the plurality of screen keys of the remote controller.

2. The display apparatus of claim 1, further comprising a communicator connected with the remote controller,
   wherein the controller receives the control signals from the remote controller through the communicator.

3. A method for controlling a screen by a remote controller, the method comprising:
   receiving a user input corresponding to one of a plurality of screen keys in the remote controller for controlling a display apparatus on which a content image is displayed; and
   outputting a control signal corresponding to the selected screen key to the display apparatus,
   wherein the outputting comprises:
   in response to a first screen key among the plurality of screen keys being selected, outputting a first control signal, and in response to a second screen key among the plurality of screen keys being selected, outputting a second control signal,
   wherein the first control signal is for changing a mode of the display apparatus from a one screen mode to a plurality of screen areas mode, for scaling a content image displayed in the one screen mode for display in a first screen area of a plurality of screen areas in the plurality of screen areas mode and for displaying the scaled content image in the first screen area, and the second control signal is for changing the mode of the display apparatus from the one screen mode to the plurality of screen areas mode, for scaling the content image displayed in the one screen mode for display in a second screen area of the plurality of screen areas that is different than the first screen area and for displaying the scaled content image in the second screen area,
   wherein each of the plurality of screen areas displayed on the display apparatus correspond to a respective one of the plurality of screen keys of the remote controller.

4. The method of claim 3, wherein the content image comprises a content which is being displayed on the display apparatus, and a content which is displayed on the display apparatus by a key selected on the remote controller.

5. The method of claim 3, wherein the content image comprises an application screen on which an application is executed and displayed, a TV broadcast screen, a web page, or a smart hub screen.

6. The method of claim 3, wherein a number of the plurality of screen keys is determined by device information of the display apparatus.

7. The method of claim 3, wherein the receiving the first user input comprises, in response to the selection of the first screen key being maintained for a threshold time, outputting a second control signal to display a plurality of thumbnail content displayable on the screen area corresponding to the first screen key on the display apparatus.

8. The method of claim 7, further comprising:
   receiving a second user input corresponding to a selection of a direction key provided on the remote controller; and
   outputting a third control signal corresponding to the selection of the direction key to the display apparatus,
   wherein the third control signal comprises information for displaying a content selected from among the plurality of thumbnail content, on the screen area corresponding to the first screen key.

9. The method of claim 7, wherein a size of the thumbnail content is smaller than a size of the screen area corresponding to the first screen key.

10. The method of claim 8, further comprising:
    maintaining the selection of the first screen key and continuously receiving a third user input corresponding to a selection of a smart hub key provided on the remote controller; and
    outputting a fourth control signal corresponding to the selection of the smart hub key to the display apparatus,
    wherein the fourth control signal comprises information for displaying a smart hub screen corresponding to the smart hub key on the screen area corresponding to the first screen key from among the plurality of screen areas.

11. A system comprising:
    a display apparatus having a screen that is configurable into a plurality of screen areas, the display apparatus comprising:
    a display;
    a receiver configured to receive a control signal, and
    a first controller configured to control the receiver and the display; and
    a remote controller comprising:
    a plurality of screen keys, each corresponding to a different screen area among the plurality of screen areas of the display apparatus,
    an output interface configured to output a control signal, and a second controller configured to control the output interface to output the control signal corresponding to one of a plurality of screen keys, wherein the first controller of the display apparatus, in response to the control signal from the remote controller being received by the receiver of the display apparatus while displaying a content image in a one screen mode on the display, changes a display mode from the one screen mode to a plurality of screen areas mode, scales the content image that is displayed for display in a first screen area of a plurality of screen areas in the plurality of screen areas mode, and -displays the scaled content image in the first screen area when the received control signal corresponds to a first screen key among the plurality of screen keys, and changes the display mode from the one screen mode to the plurality of screen areas mode, scales the content image that is displayed for display in a second screen area of the plurality of screen areas that is different than the first screen area, and displays the scaled content image in the second screen area when the received control signal corresponds to a second screen key among the plurality of screen keys.

12. The system of claim 11, wherein the content image comprises an application screen on which an application is executed and displayed, a TV broadcast screen, a web page, a smart hub screen, or a thumbnail screen.

* * * * *